United States Patent [19]
Imoto et al.

[11] Patent Number: 5,941,519
[45] Date of Patent: Aug. 24, 1999

[54] DOCUMENT SEPARATING MECHANISM FOR AN AUTOMATIC DOCUMENT FEEDER

[75] Inventors: Shinji Imoto, Kawasaki; Masahiro Minato, Yokohama; Takashi Fujii, Omiya, all of Japan

[73] Assignee: Ricoh Company, Ltd., Tokyo, Japan

[21] Appl. No.: 08/801,146

[22] Filed: Feb. 18, 1997

[30] Foreign Application Priority Data

Feb. 19, 1996 [JP] Japan .................................... 8-030812
Aug. 30, 1996 [JP] Japan .................................... 8-229473

[51] Int. Cl.⁶ .................................................... B65H 3/52
[52] U.S. Cl. .......................... 271/122; 271/124; 271/110
[58] Field of Search ................... 271/3.05, 3.13, 271/122, 124, 125, 110

[56] References Cited

U.S. PATENT DOCUMENTS

| | | |
|---|---|---|
| 3,635,465 | 1/1972 | Beery . |
| 4,085,929 | 4/1978 | Tuchiya et al. . |
| 4,105,199 | 8/1978 | Sato et al. ............................. 271/122 |
| 4,376,530 | 3/1983 | Akai . |
| 5,024,430 | 6/1991 | Seki et al. . |
| 5,054,766 | 10/1991 | Seki et al. . |
| 5,100,119 | 3/1992 | Komada et al. . |
| 5,137,266 | 8/1992 | Mori et al. . |
| 5,253,860 | 10/1993 | Hirose et al. . |
| 5,330,170 | 7/1994 | Uotani et al. . |
| 5,344,134 | 9/1994 | Saeki et al. ............................. 271/110 |
| 5,431,385 | 7/1995 | Holbrook ............................... 271/122 |
| 5,431,390 | 7/1995 | Hirose et al. . |
| 5,484,143 | 1/1996 | Hirose et al. . |
| 5,769,411 | 6/1998 | Nakagawa et al. ..................... 271/122 |

FOREIGN PATENT DOCUMENTS

| | | |
|---|---|---|
| 21 51 548 | 4/1972 | Germany . |
| 27 00 377 | 9/1978 | Germany . |
| 30 48 036 | 9/1981 | Germany . |
| 56-99136 | 8/1981 | Japan . |
| 1-92142 | 4/1989 | Japan . |
| 403223041 | 10/1991 | Japan ................................... 271/110 |
| 4-345434 | 12/1992 | Japan . |
| 2245548 | 1/1992 | United Kingdom .................. 271/3.13 |

*Primary Examiner*—H. Grant Skaggs
*Attorney, Agent, or Firm*—Oblon, Spivak, McClelland, Maier & Neustadt, P.C.

[57] ABSTRACT

In an automatic document feeder (ADF), a document separating mechanism includes a separator belt. Documents stacked on a tray are caused to abut against the separator belt at their leading edges and then introduced into a nip between the belt and a feed roller to be separated one by one. The angle at which the documents abut against the separator belt is variable. The separator belt is movably mounted on a guide pivotable about the shaft of a separator roller. The above angle refers to an angle between the surface of the documents stacked on the tray and the surface of the portion of the separator belt against which the documents abut.

46 Claims, 21 Drawing Sheets

FIG. 24
|  | THIN SHEET MODE | THICK SHEET MODE |
|---|---|---|
| PICK UP | Lo.1 | Lo.2 |
| SEPARATION & FEED | Hi.1 | Hi.2 |
FIG. 25
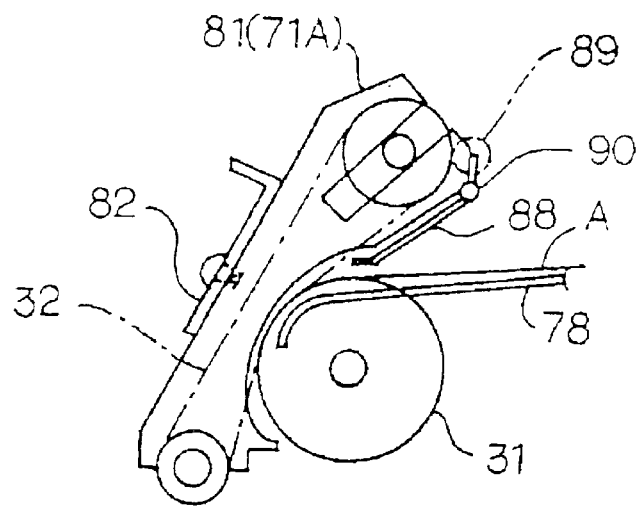
FIG. 26
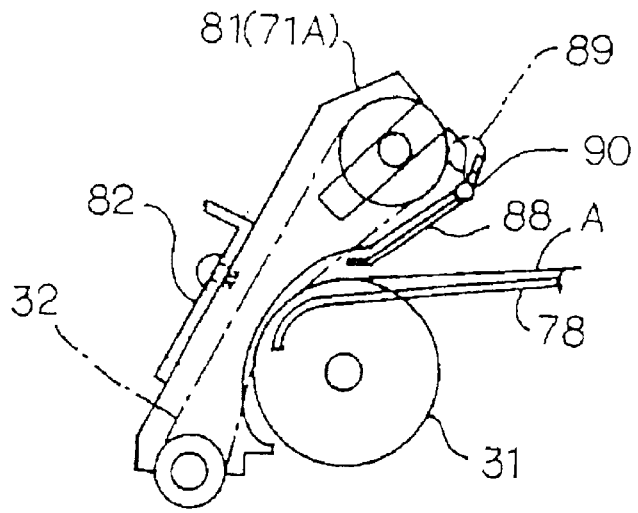

DOCUMENT SEPARATING MECHANISM FOR AN AUTOMATIC DOCUMENT FEEDER

BACKGROUND OF THE INVENTION

1. Field of the Invention

The present invention relates to an automatic document feeder (ADF) and, more particularly, to a document separating mechanism included in an ADF for separating documents, or sheets, stacked on a tray one by one, feeding the separated document to a glass platen, and returning the document to another tray after illumination.

2. Discussion of the Background

A document separating mechanism for the above application may include a feed roller rotatable in an intended direction of document feed, and a separator belt turnable in a direction opposite to the direction of document feed in contact with the feed roller, as taught in, e.g., Japanese Patent Laid-Open Publication No. 3-216437, 56-99136, 1-92142, or 4-345434. However, none of the prior art mechanisms of the type using a separator belt can vary the pressure of the belt or the angle of the belt relative to the document (abutting angle hereinafter) during document feed. In practice, the ADF deals with various kinds of documents including relatively thick documents, or sheets, which are difficult to separate. Therefore, to separate even thick documents and feed them without any misfeed, it is necessary to set up a comparatively small abutting angle. In addition, to avoid misfeed and the simultaneous feed of a plurality of documents, i.e., overlapping feed, a relatively high contact pressure must be set up. A small abutting angle promotes the easy entry of the documents in the mechanism and thereby obviates misfeed. However, the small angle allows even the next document to enter the mechanism when the current document is separated. As a result, the consecutive documents rub against and contaminate each other. Further, a high contact pressure aggravates such contamination of the documents. Moreover, if the abutting angle is reduced when thin documents are dealt with, two or more of the documents are apt to enter the nip between the separator belt and the feed roller, resulting in overlapping feed.

SUMMARY OF THE INVENTION

It is therefore an object of the present invention to provide a document separating mechanism for an ADF and achieving an enhanced separating ability without regard to the thickness of documents, and thereby obviating defecting feed including misfeed and overlapping feed.

It is another object of the present invention to provide a document separating mechanism for an ADF and capable of surely feeding documents while freeing them from contamination.

In accordance with the present invention, a document separating mechanism for an ADF and for separating documents stacked on a tray one by one while feeding them to a preselected position includes a feed roller rotatable in the intended direction of document feed relative to the documents stacked on the tray. A strip-like turnable member is movable in the direction opposite to the direction of document feed in pressing contact with the feed roller. The documents are abutted against the turnable member at their leading edges and received between the feed roller and the turnable member. An abutting angle varying mechanism varies in at least two steps an abutting angle between the surface of the documents stacked on the tray and the surface of a portion of the turnable member against which the leading edges of the documents abut.

Also, in accordance with the present invention, a document separating mechanism for an ADF and for separating documents stacked on a tray one by one while feeding them to a preselected position includes a feed roller rotatable in the intended direction of document feed relative to the documents stacked on the tray. A strip-like turnable member is movable in the direction opposite to the direction of document feed in pressing contact with the feed roller. The documents are abutted against the turnable member at their leading edges and received between the feed roller and the turnable member. A pressure varying mechanism varies a pressure acting between the feed roller and the turnable member between the time of abutment of the documents and the time of document feed.

BRIEF DESCRIPTION OF THE DRAWINGS

The above and other objects, features and advantages of the present invention will become apparent from the following detailed description taken with the accompanying drawings in which:

FIG. 24 is a table listing a relation between the position of the L-shaped angle, the thickness of documents, and the separation and feed procedure;

FIGS. 25 and 26 are side elevations each showing the third embodiment in a particular condition;

DESCRIPTION OF THE PREFERRED EMBODIMENTS

Figure 1:
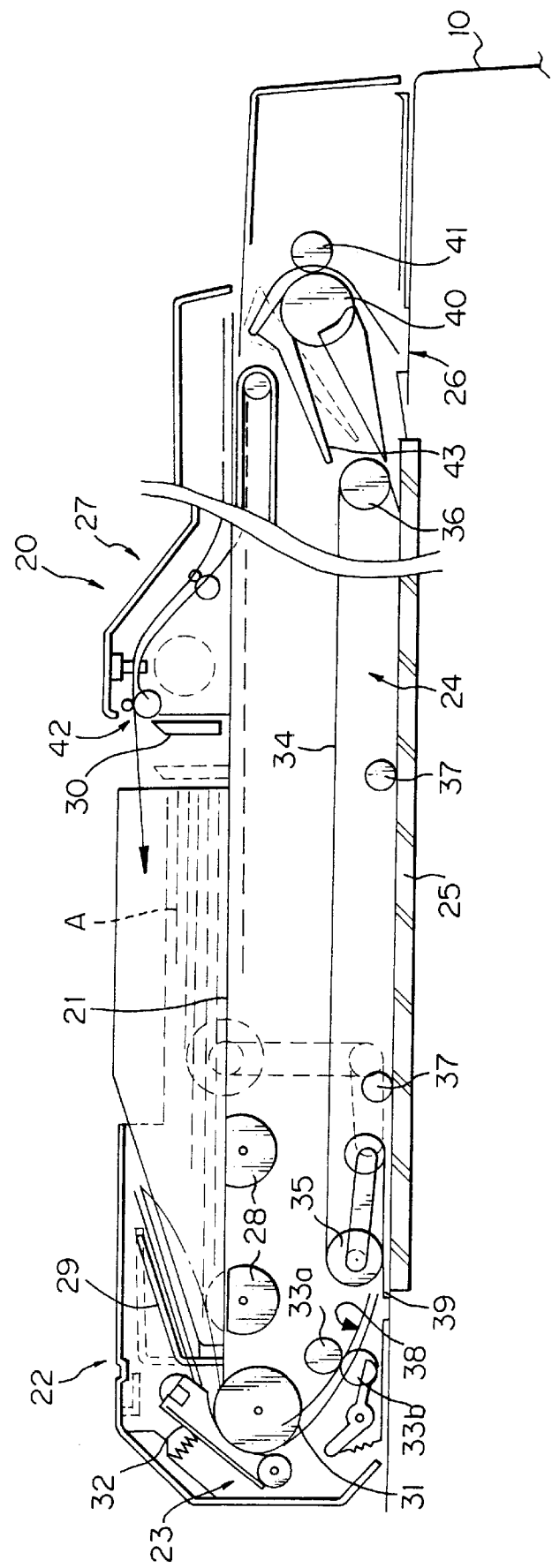
FIG. 1 is a fragmentary section showing a first embodiment of the ADF in accordance with the present invention.

Referring to FIG. 1 of the drawings, a first embodiment of the ADF in accordance with the present invention is shown and generally designated by the reference numeral 20. As shown, the ADF 20 is mounted on the body 10 of a copier. There are also shown in FIG. 1 a document tray 21, a document feeding section 22, a document separating section 23, a conveying section 24, a glass platen 25, a turning section 26, and a returning section 27.

The ADF 20 is positioned in such a manner as to cover the copier body 10. Documents A are stacked on the tray 21 and sequentially conveyed toward the glass platen 25 one by one while being separated by the separating section 23. After the document has been illuminated on the glass platen 25, it is discharged onto the tray 21. The feeding section 22 has pick-up rollers 28, a stop 29, and a presser plate 30. The pick-up rollers 28 are positioned below the stack of documents A, and each is formed with a notch. When the documents A are set on the tray 21, the leading edge of the stack is abutted against the stop 29 and pressed by the pick-up rollers 28. In this condition, the stop 29 separates the documents discharged onto the tray 21 via the glass platen 25 from the documents A existing on the tray 21. The presser plate 30 pushes the documents A abutting against the stop 29 to the separating section 23.

The separating section 23 has a feed roller 31 and a separator belt or strip-like turnable member 32 in order to separate the documents A one by one. The feed roller 31 is rotatable in an intended direction of document feed (counterclockwise as viewed in FIG. 1) relative to the documents A to be separated. The separator belt 32 is held in pressing contact with the feed roller 31 and movable in the direction opposite to the direction of document.

Pull-out rollers 33a and 33b are positioned downstream of the feed roller 31 in the direction of document feed so as to convey the separated document onto the glass platen 25. A conveyor belt 34 is positioned on the glass platen 25 and passed over a drive roller 35 and a driven roller 36. When the drive roller 35 is driven by a conveyance motor, which will be described, it causes the belt 34 to run, conveying the document A to a preselected position on the glass platen 25. A plurality of press rollers 37 press the lower run of the belt 34 against the glass platen 25. A registration sensor or document sensing means 38 is interposed between the pull-out rollers 33a and 33b and the belt 34. The registration sensor 38 determines whether or not the leading edge of the document A has been separated by the separating section 23 and reached the pull-out rollers 33a and 33b. In addition, the sensor 38 senses the trailing edge of the same document A.

As soon as the registration sensor 38 senses the trailing edge of the document A, pulses relating to the rotation angle of the conveyance motor begin to be counted, as will be described. When the number of pulses reaches a predetermined number, the motor and therefore the conveyor belt 34 are brought to a stop and then driven in the reverse direction until the document A abuts against a scale 39. As a result, the document A is positioned on the glass platen 25. After the illumination, the document A is conveyed to the turning section 26 by the conveyor belt 34. When the document A is a one-sided or simplex document, a turn roller 40 and a press roller 41 included in the turning section 26 directly discharges the document A onto the tray 21 via an outlet 42. When the document A is a two-sided or duplex document, a path selector 43 is switched to a position indicated by a phantom line in FIG. 1. As a result, the document A is turned over, again conveyed to the glass platen 25, and then driven out onto the tray 21 after illumination.

Figure 2:
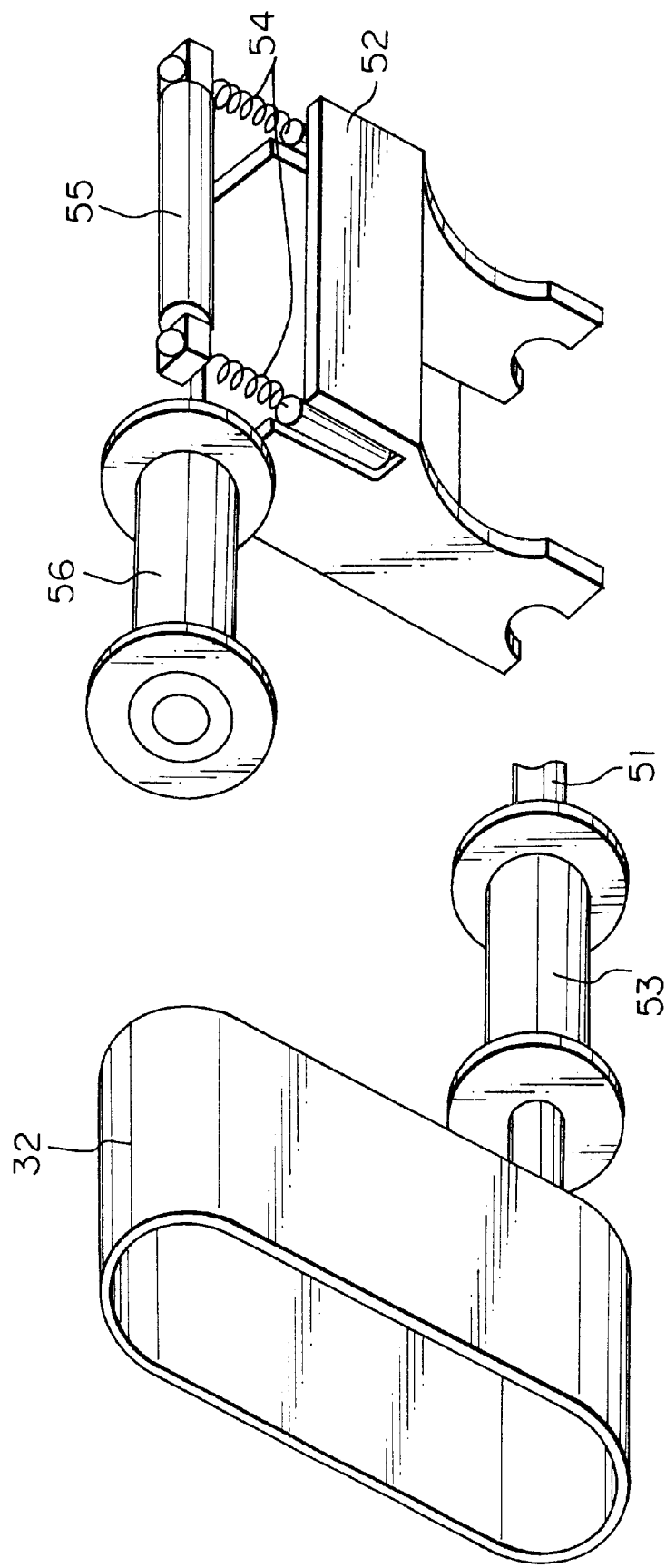
FIG. 2 is a fragmentary exploded perspective view of a document separating mechanism included in the embodiment.

FIG. 2 is a fragmentary exploded view showing a document separating mechanism included in the separating section 23. As shown, the mechanism includes a guide or pivotable body 52 pivotable about a drive shaft 51. A drive roller 53 is mounted on the drive shaft 51. A driven shaft 55 is mounted on the free end of the guide 52 via compression springs 54. A driven roller 56 is mounted on the driven shaft 55. The separator belt 32 is passed over the drive roller 53 and driven roller 56. A drive source, not shown, causes the drive shaft 51 to rotate counterclockwise, thereby causing the belt 32 to move in the direction opposite to the direction of document feed. Drive control means controllably drives the drive source. Further, as shown in FIGS. 3 and 4, the mechanism includes the feed roller 31, a spring 57 constantly biasing the guide 52 such that the belt 32 remains in surface-to-surface contact with the feed roller 31, a stop 58 for stopping the guide 52 moved in the direction in which the pressure acting between the belt 32 and the feed roller 31 increases, and a stop 59 for stopping the guide 52 moved in the direction opposite to the above direction.

Figure 3:
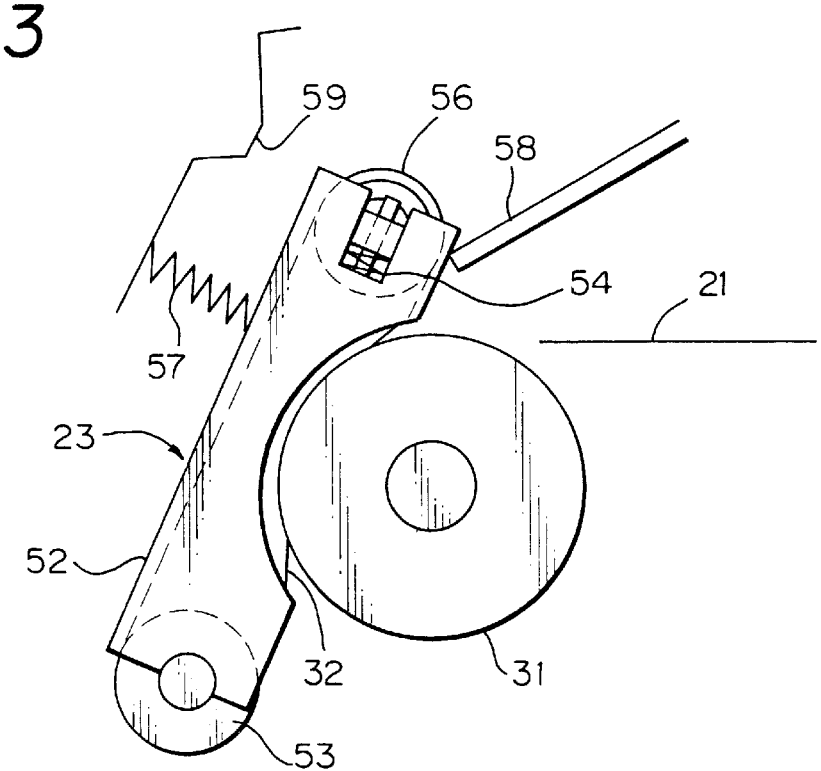
FIGS. 3 and 4 are side elevations each showing the document separating mechanism in a particular condition.
Figure 4:
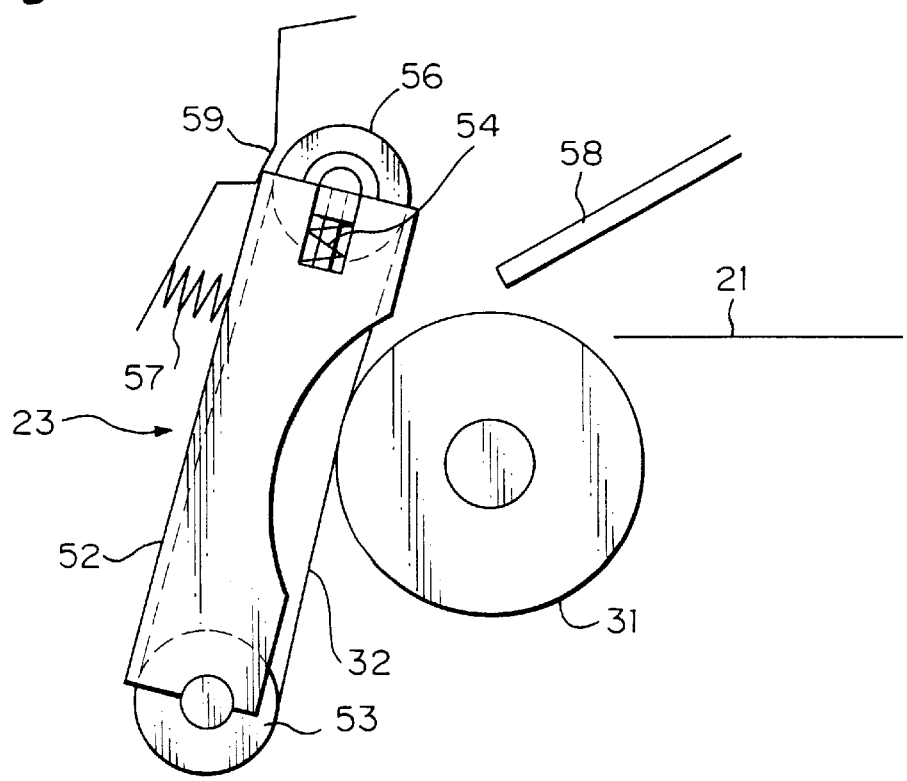

FIG. 3 shows a condition wherein the feed roller 31 is rotating in the direction of document feed (counterclockwise) while the separator belt 32 is held in a halt. As shown, the guide 52 is biased by a spring 57 and stopped by the stop 58, pressing the belt 32 strongly against the feed roller 31. The compression springs 54 are compressed and maintain the tension of the belt 32 accurately. FIG. 4 shows a condition wherein the feed roller 31 is rotating in the direction of document feed (counterclockwise) while the belt 32 is running in the direction opposite to the direction of document feed (counterclockwise). In this condition, the roller 31 and belt 32 frictionally contact each other, generating a moment of rotation about the drive shaft 51. Consequently, the guide 52 is stopped by the stop 59 while overcoming the force of the spring 57. The belt 32 therefore remains in weak contact with the roller 31. The compression springs 54 are uncompressed, maintaining the tension of the belt 32 accurately.

Figure 5:
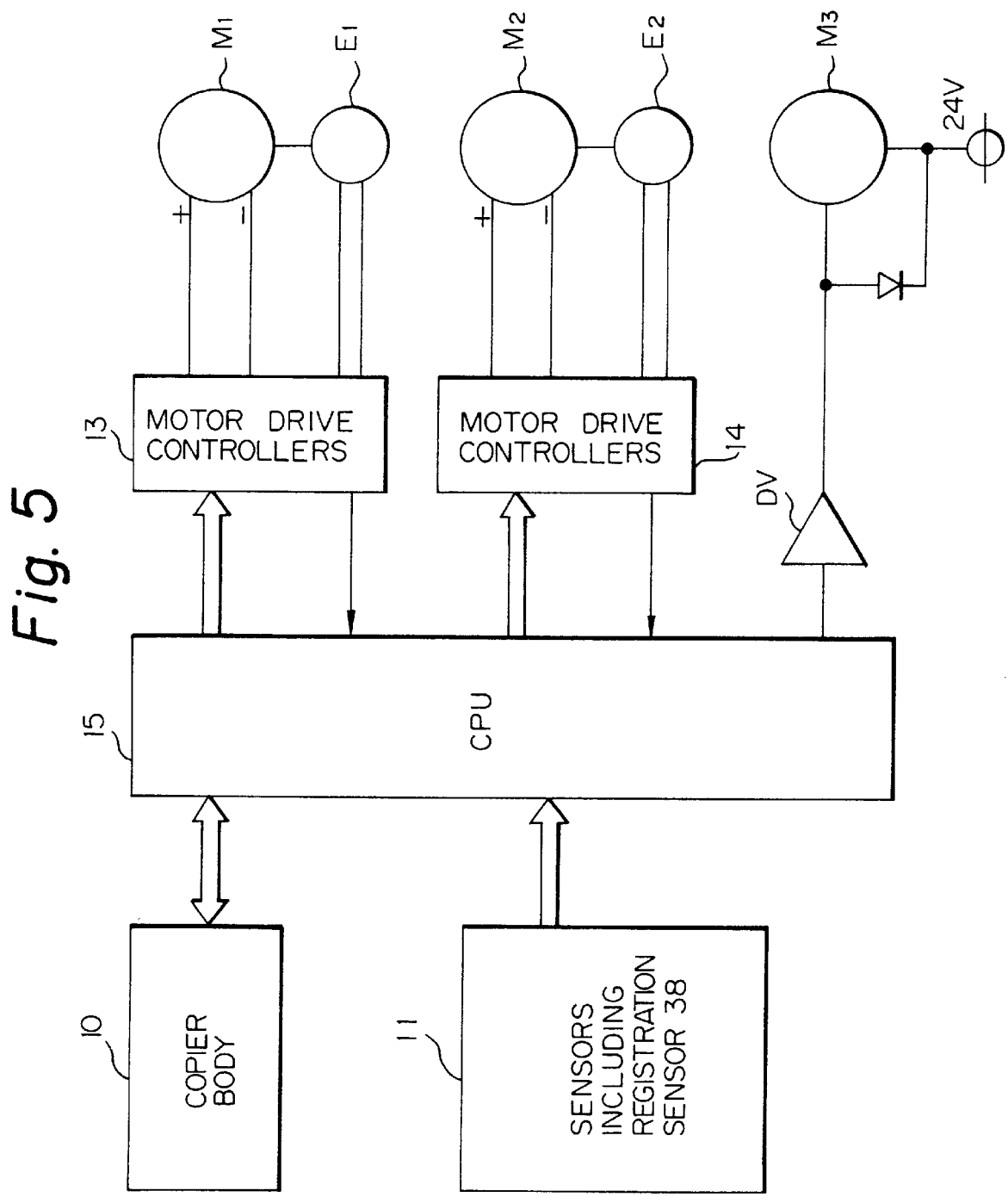
FIGS. 5 is a block diagram schematically showing a control system included in a copier on which the ADF is mounted.

FIG. 5 shows a control system included in the embodiment. As shown, the copier body 10, sensors 11 including the registration sensor 38 and motor drive controllers 13 and 14 are connected to a CPU (Central Processing Unit) 15. The motor drive controller 13 is connected to a document feed motor M1 for driving the feed roller 31, and an encoder E1 associated with the motor M1. The other motor drive controller 14 is connected to a conveyance motor M2 and an encoder E2 associated with the motor M2. The CPU 15 is connected also to a belt drive motor (drive source) for driving the 32 via a motor driver DV. The CPU 15 controls the various units connected thereto collectively.

Figure 6:
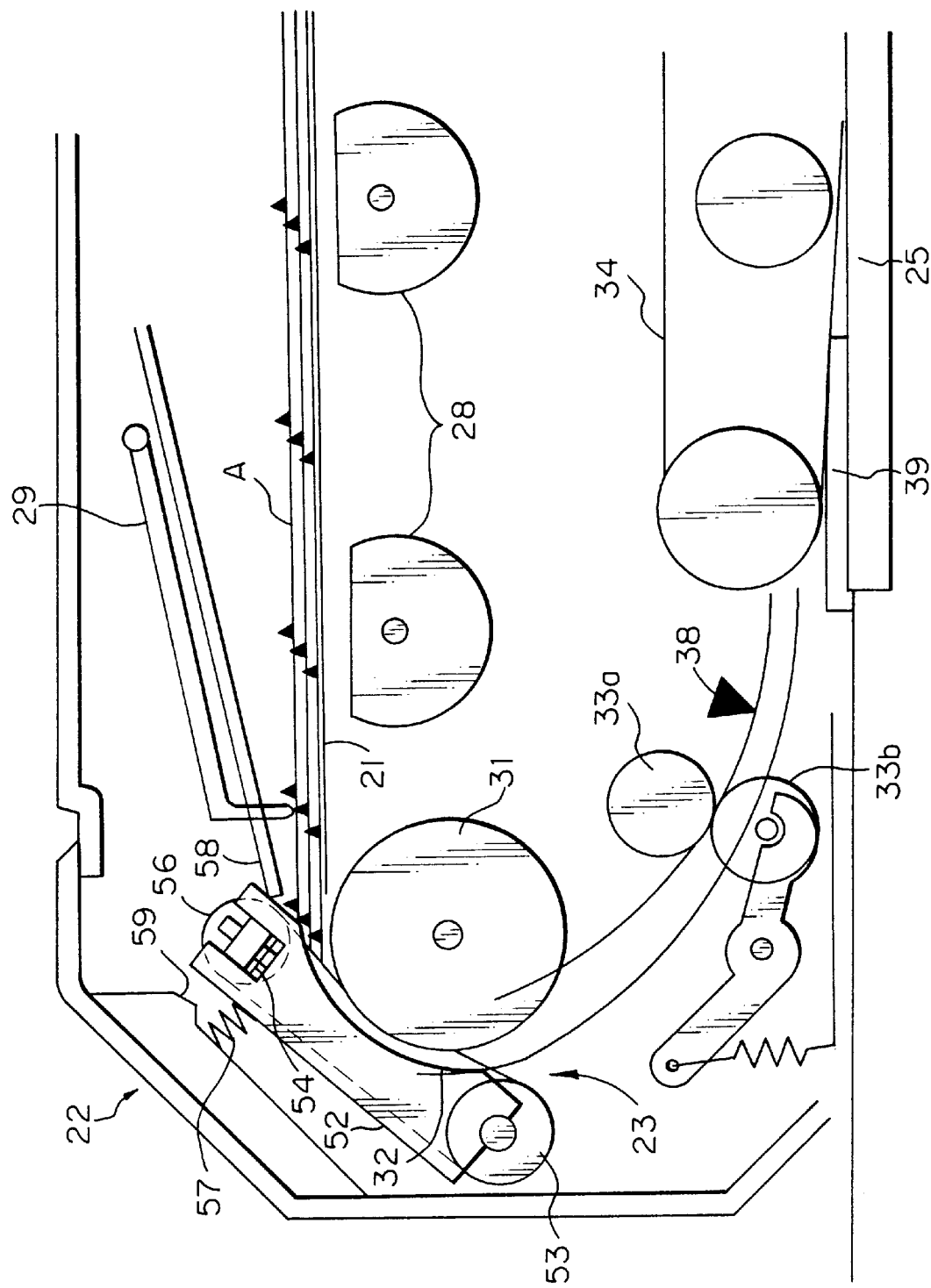
FIGS. 6–10 show how the document separating section separates documents.
Figure 11:
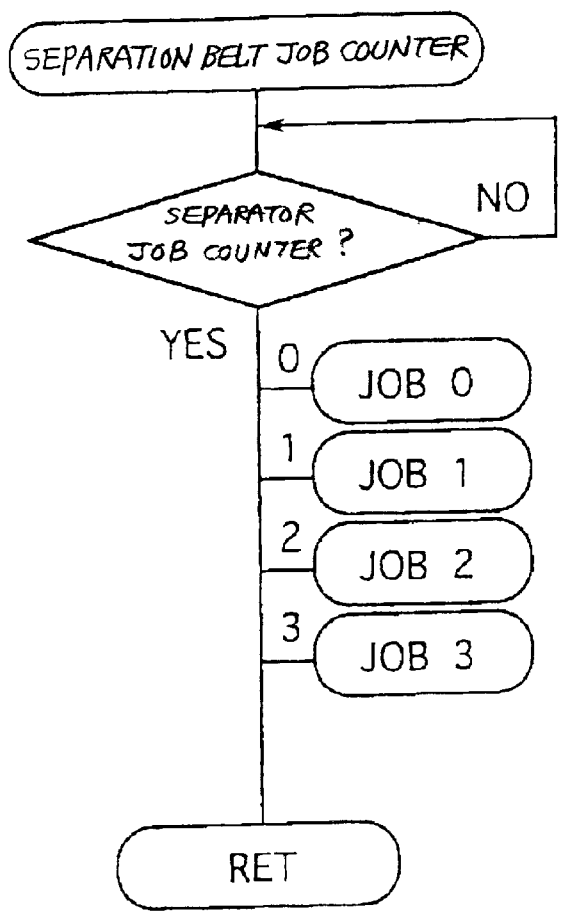
FIGS. 11–18 are flowcharts each showing a specific routine particular to the embodiment.
Figure 12:
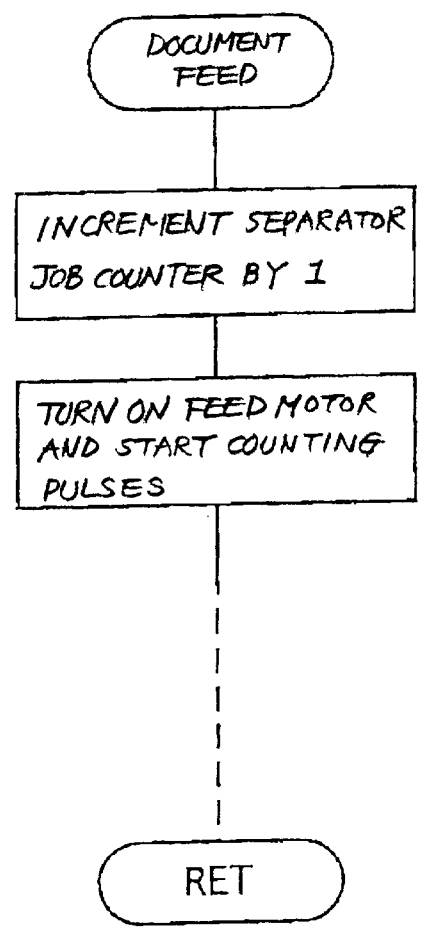
Figure 13:
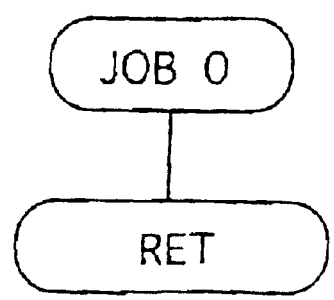

As shown in FIG. 6, assume that the operator abuts the documents A against the stop 29 and then causes the copier to start operating. Then, as shown in FIG. 11, various jobs which will be described later are executed every time a separation job counter, not shown, operates. As shown in FIG. 12, the stop 29 is released by a document feed signal output from the copier body 10. The presser plate 30 is moved forward while the pick-up rollers 28 are caused to make one rotation each, shifting the stack of documents A to the separating section 23. Thereafter, the belt 32 and feed roller 31 cooperate to separate and feed the lowermost document A.

Figure 7:
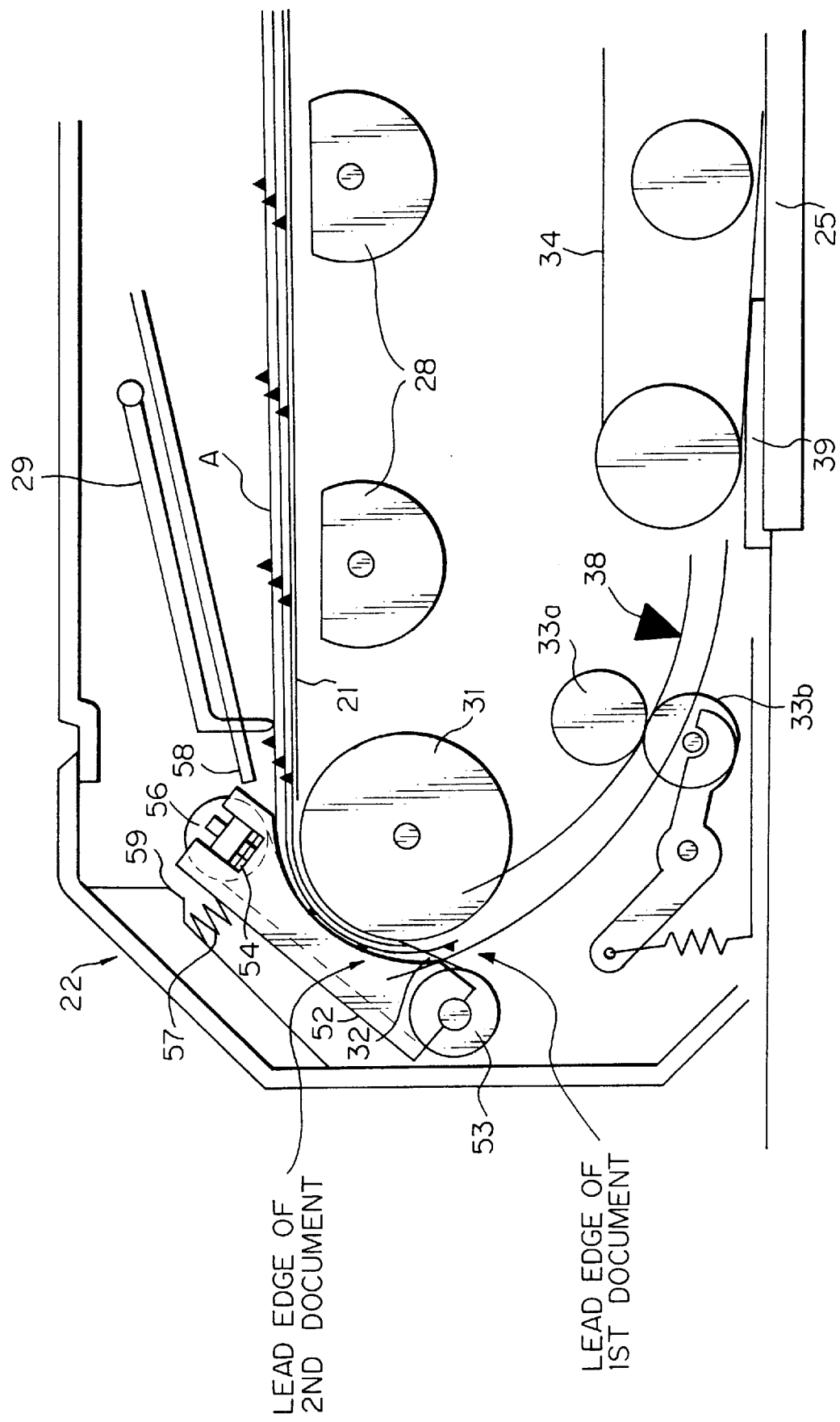
Figure 8:
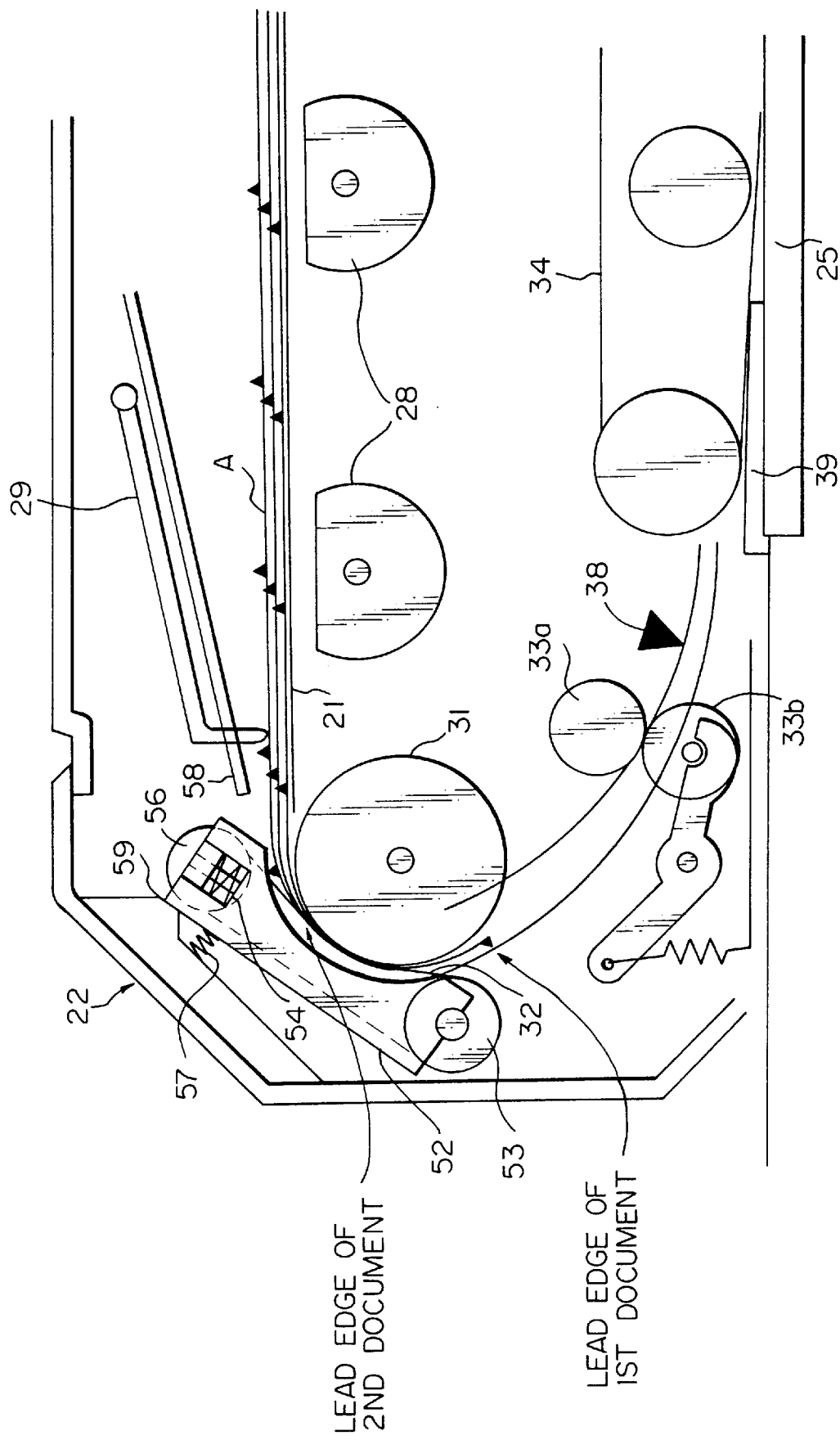
Figure 14:
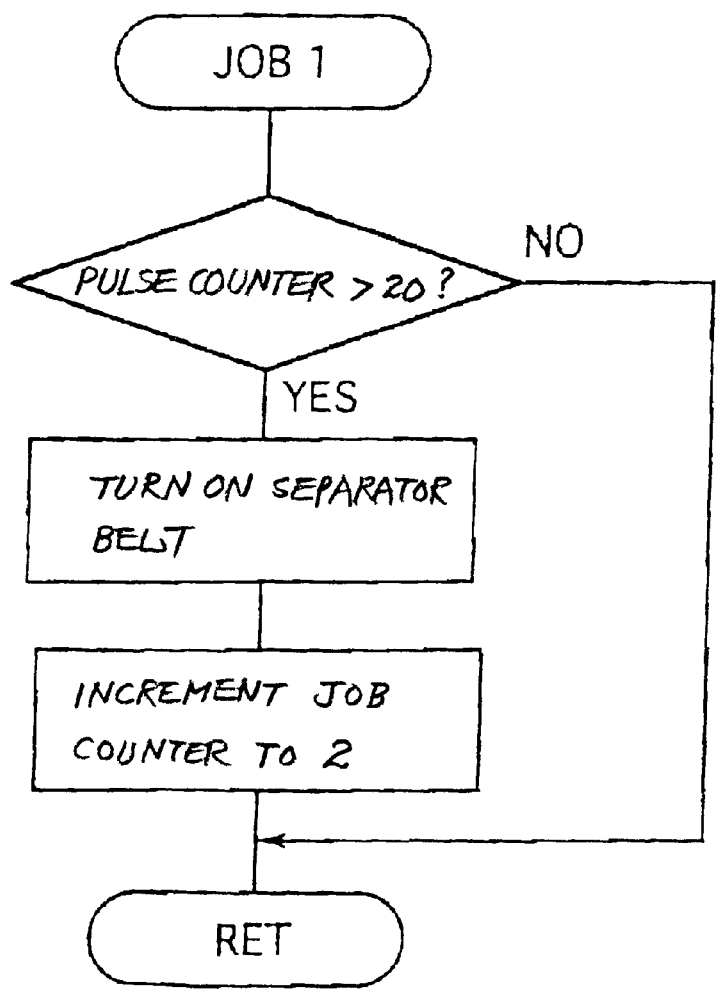

FIGS. 13–16 show jobs 0–3, respectively. As shown in FIG. 14, the pick-up rollers 28 each make another rotation from the position shown in FIG. 6 in order to help the lowermost document A be fed in cooperation with the feed roller 31 (see FIG. 7). When the encoder E1 associated with the feed motor M1 outputs a preselected number of pulses, e.g., twenty pulses, the CPU 15, FIG. 5, determines that the lowermost document A has entered the nip between the feed roller 31 and the separator belt 32. Then, the CPU 15 causes the belt 32 to run in the direction opposite to the direction of document feed. As a result, the guide 52 is caused to pivot counterclockwise and increases the angle between the document A and the belt 32 (abutting angle hereinafter), as shown in FIG. 8. In this condition, the pressure acting on the document A at the nip is cancelled while the entry of the next document A in the nip is obstructed. At the same time, the pressure of the belt 32 is reduced. In addition, the belt 32 moving in the direction opposite to the direction of document feed shifts the documents A on the tray 21 to the right, as viewed in FIG. 8. In this manner, the document A is free from misfeed and contamination.

Figure 15:
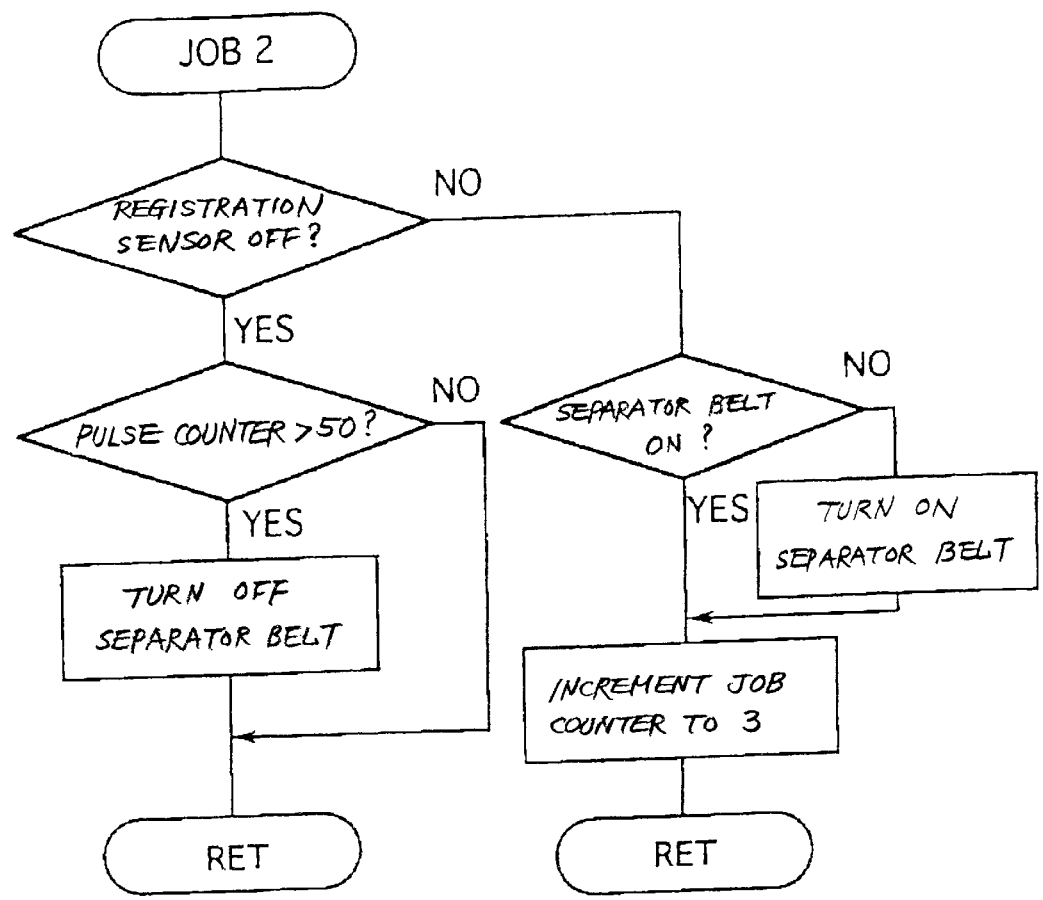

Referring to FIG. 15, when the registration sensor 38 senses the leading edge of the separated document A, the CPU 15 causes the feed roller 31 to stop rotating. A one-way clutch is built in the feed roller 31. Therefore, the pull-out rollers 33a and 33b pull out the document A from the separating section 23 and convey it toward the glass platen 25. Assume that the encoder E1 outputs more than a preselected number of pulses, e.g., fifty, before the sensor 38 senses the leading edge of the document A. Then, the CPU 15 determines that the feed roller 31 and document A are slipping on each other, and causes the belt 32 to stop moving. As a result, the guide 52 is moved clockwise in order to reduce the abutting angle while increasing the pressure of the belt 32. This successfully conveys the document A to the pull-out rollers 33a and 33b. As soon as the sensor 38 senses the leading edge of the document A, the CPU 15 again causes the belt 32 to move in the direction opposite to the direction of document feed.

Figure 9:
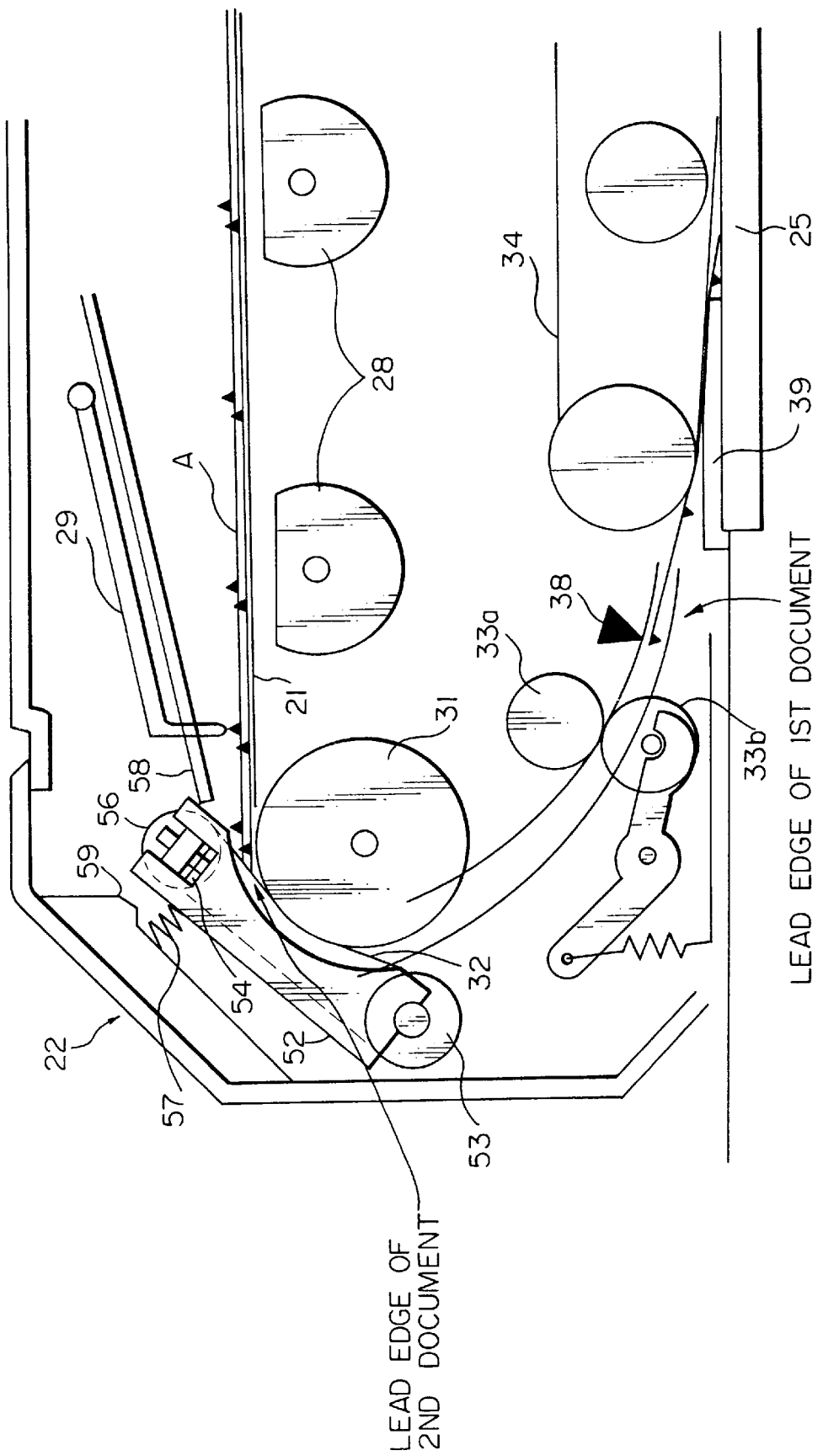
Figure 16:
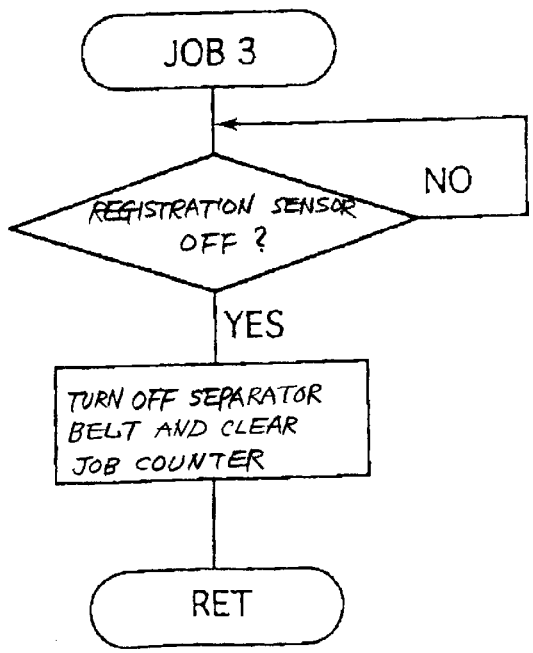

As shown in FIG. 16, assume that the sensor 38 has sensed the leading edge of the document A being conveyed toward the glass platen 25. Then, the CPU 15 causes the belt 32 to stop rotating with the result that the abutting angle decreases, as shown in FIG. 9. At the same time, the pressure of the belt 32 increases. This prepares the mechanism for the separation and feed the next document A. When the encoder E2 assigned to the conveyance motor M2 outputs a preselected number of pulses, the CPU 15 causes the belt 34 to stop running and then run in the reverse direction until the document A abuts against the scale 39. After the document A so positioned on the glass platen 25 has been illuminated, it is discharged onto the tray 21 via the turning section 26 and returning section 27.

Figure 10:
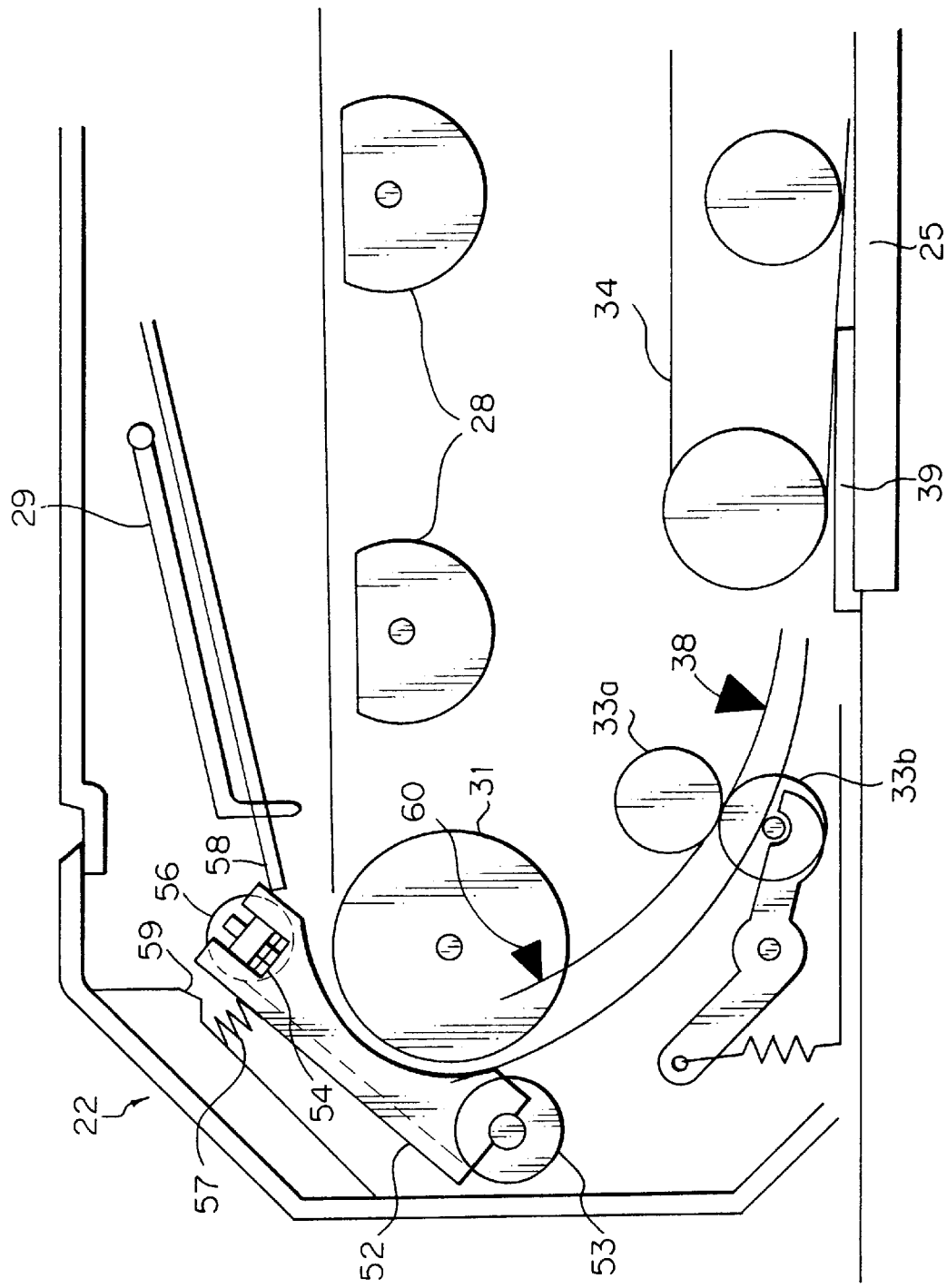
Figure 17:
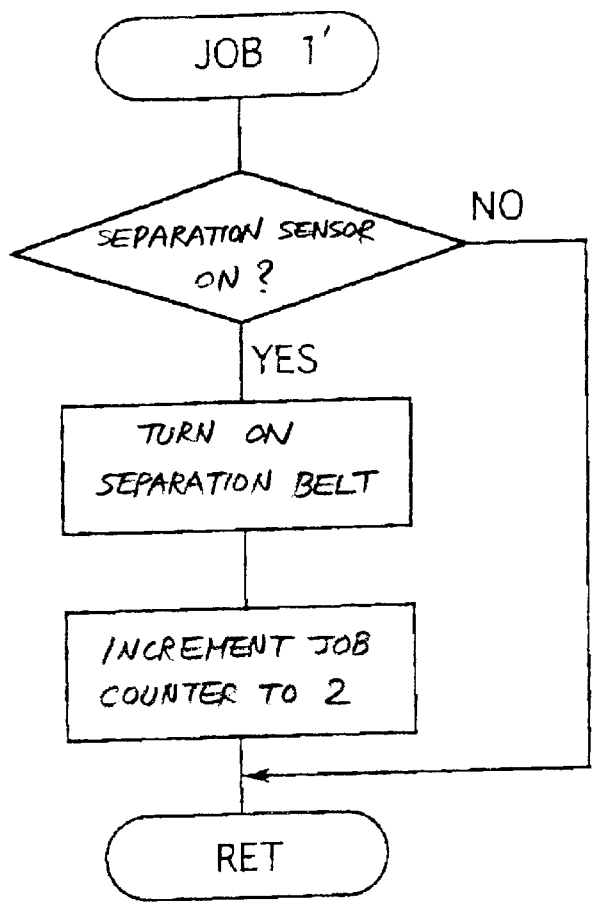
Figure 18:
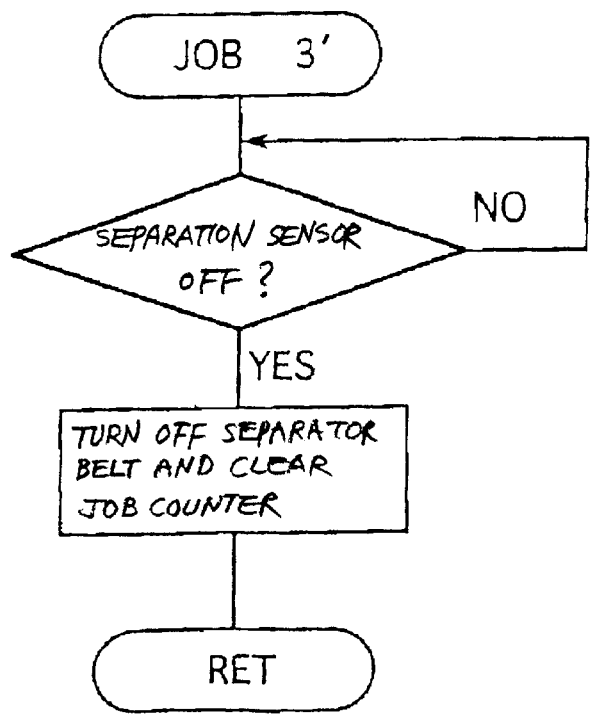

In the above embodiment, the CPU 15 uses the output pulses of the encoder E1 in determining whether or not the leading edge of the document A has entered the nip of the separating section 23. Alternatively, as shown in FIG. 10, document sensing means (separation sensor) 60 may be located adjacent to, but downstream of, the nip in order to sense the entry of the document A in the nip. This alternative scheme will further promote the sure separation and feed of the document A. FIGS. 17 and 18 respectively demonstrate a job 1' and a job 3' based on the output of the separation sensor 60 and replacing the jobs 1 and 3, respectively.

Further, in the illustrative embodiment, the means for varying the abutting angle and the pressure of the belt 32 is implemented by the combination of the moment of rotation derived from the drive load of the belt 32 and the force of the spring 57. This combination may be replaced with a cam or a solenoid, if desired.

Figure 19:
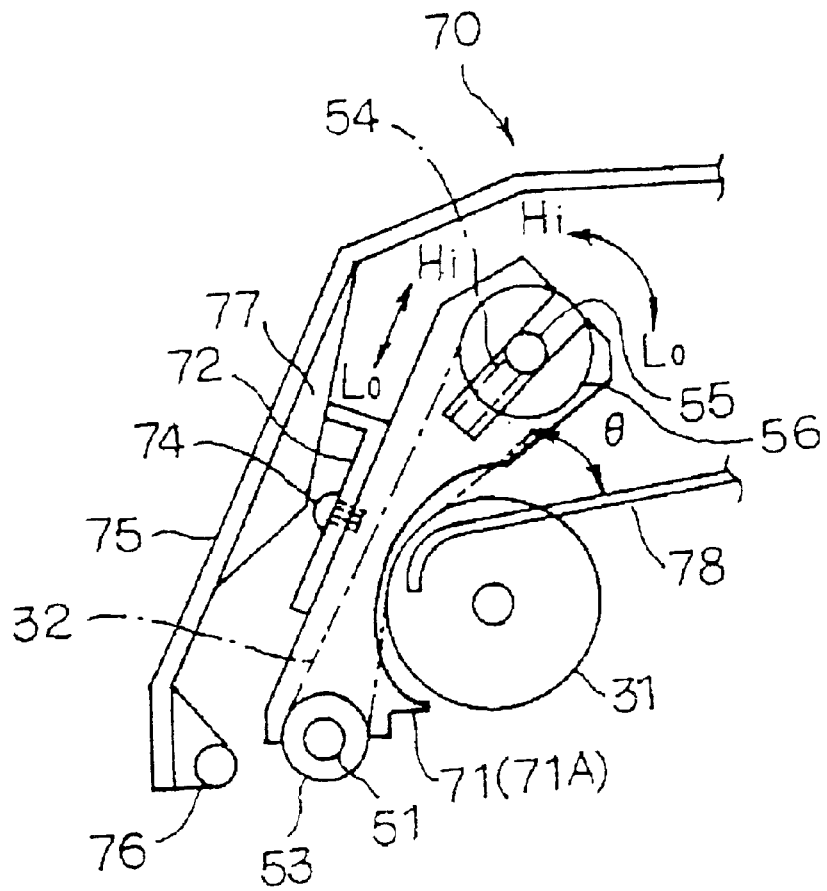
FIG. 19 is a side elevation showing a second embodiment of the present invention.
Figure 20:
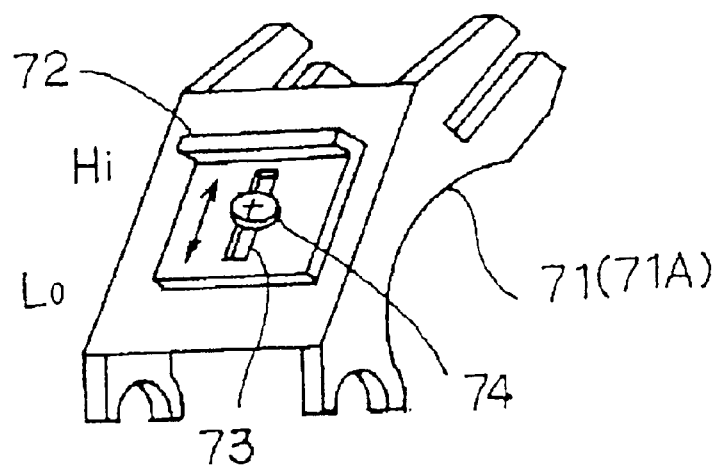
FIG. 20 is a perspective view of a guide included in the second embodiment.

Referring to FIG. 19, a second embodiment of the ADF in accordance with the present invention will be described. FIG. 20 shows a pivotable guide 71 substituted for the guide 5 2, FIG. 2. In FIGS. 19 and 20, the same or similar structural elements as or to the elements shown in FIG. 2 and other figures are designated by identical reference numerals, and a detailed description thereof will not be made in order to avoid redundancy.

As shown, the guide 71 has a guide body 71A and a generally L-shaped angle 72 affixed to the body 71A. The separator belt 32 is passed over the drive shaft 51 and driven shaft 55. The guide 71 is pivotable about the drive shaft 51. The angle 71 is fastened to the rear of the guide body 71A by a screw 74 through a slot 73 formed in the guide body 71A. After the angle 72 has been adjusted in position in the up-and-down direction, as viewed in FIG. 20, relative to the guide 71, it is fastened to the guide 71 by the screw 74. A cover 75 is pivotable about a shaft 76 and openable upward away from its regular position shown in FIG. 19. The cover 75 includes a rib 77. When the guide 71 is rotated counterclockwise about the drive shaft 51, the upper end of the angle 72 is stopped by the rib 77. The stopping surface of the rib 77 is inclined relative to the rear of the guide body 71A. The position where the stopping surface of the rib 77 stops the guide 71 is variable on the basis of the position of the angle 72 relative to the guide body 71A. The reference numeral 78 designates an upper document guide.

More specifically, assume that the angle 72 is suitably shifted relative to the guide body 71A and then fixed in place by the screw 74. Then, the angle of the feed roller 31 relative to the guide 71 varies on the basis of the position of the angle 72, causing the abutting angle, i.e., the angle θ at which the leading edges of the documents A abut against the belt 32, to vary. When the angle 72 is moved in a direction labeled Hi, the abutting angle θ increases and tends to avoid the simultaneous feed of a plurality of documents. On the other hand, when the angle 72 is moved in a direction labeled Lo, the abutting angle θ decreases and tends to avoid misfeed. In this case, the angle θ should only be varied by about 2 degrees. In this manner, by adjusting the position of the angle 72, it is possible to optimize the separating condition in accordance with the document condition, and therefore to accommodate a broader range of documents.

Figure 21:
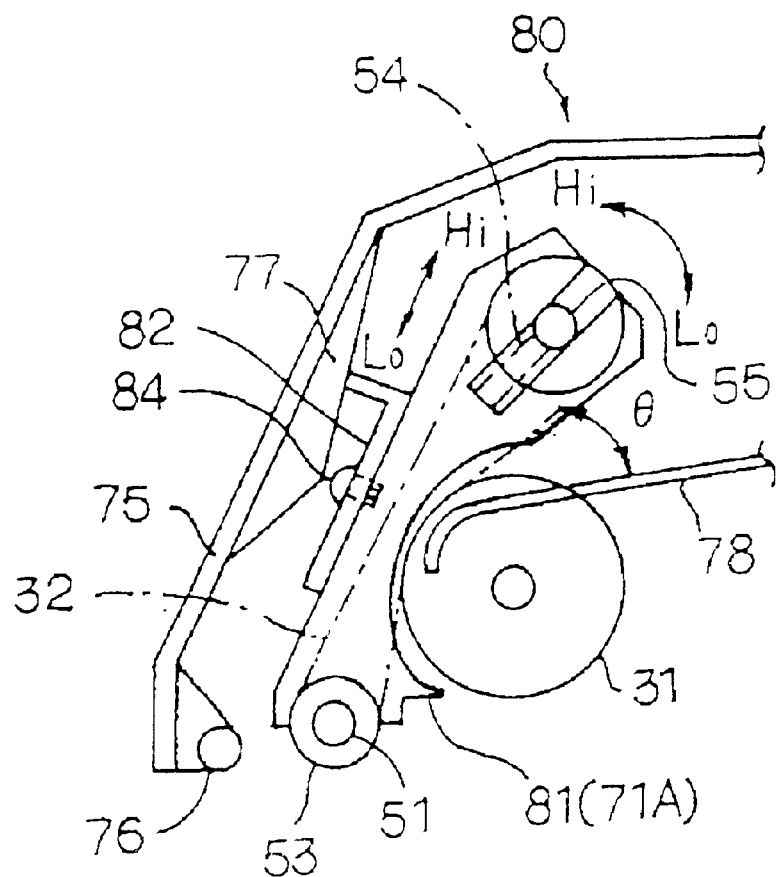
FIG. 21 is a side elevation showing a third embodiment of the present invention.
Figure 22:
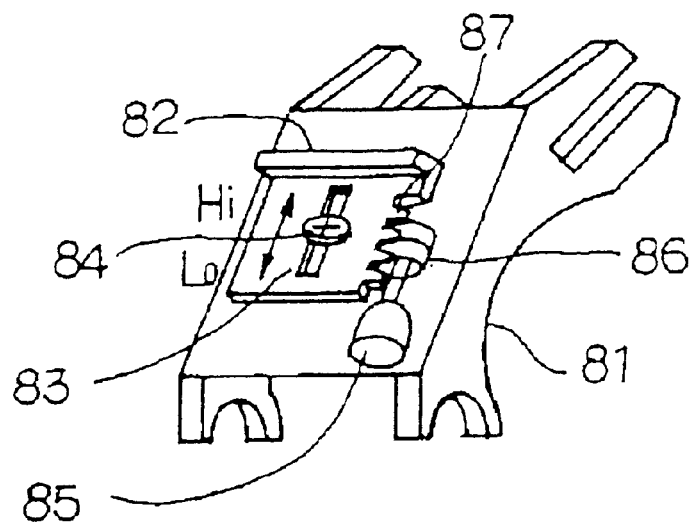
FIG. 22 is a perspective view of a guide included in the third embodiment.

FIG. 21 shows a third embodiment of the ADF in accordance with the present invention. FIG. 22 shows a pivotable guide 81 included in a document separating section 80. The guide 81 is a substitute for the guide 71 shown in FIG. 19. In FIGS. 21 and 22, the same or similar structural elements as or to the elements shown in FIG. 19 and other figures are designated by identical reference numerals, and a detailed description thereof will not be made in order to avoid redundancy.

As shown, the guide 81 has a generally L-shaped angle 82 mounted to the guide body 71A. The guide 81, like the guide 71, is pivotable about the drive shaft 51. The separator belt 32 is passed over the drive shaft 51 and driven shaft 55. The angle 82 is fastened to the rear of the guide body 71A by a stepped screw 84 through a slot 83 formed in the guide body 71A. After the angle 82 has been adjusted in position in the up-and-down direction, as viewed in FIG. 22, relative to the guide 81, it is fastened to the guide 81 by the screw 84. Further, a worm gear 86 is mounted on the output shaft of a stepping motor 85 which drives the angle 82 up and down. The angle 82 is formed with a rack 87 meshing with the worm gear 86. When the stepping motor 85 is rotated in the forward or the reverse direction, the angle 82 moves upward or downward. Again, when the guide 81 is rotated counterclockwise about the shaft 51, the upper end of the angle 82 is stopped by the rib 77. The position where the stopping surface of the rib 77 stops the guide 81 is variable on the basis of the position of the angle 82 relative to the guide body 71A.

When the stepping motor 85 is rotated to shift the angle 82 in the up-and-down direction, the abutting angle θ varies. When the angle 82 is moved in the direction Hi, the abutting angle θ increases and tends to avoid the simultaneous feed of a plurality of documents. On the other hand, when the angle 82 is moved in the direction Lo, the abutting angle decreases and tends to avoid misfeed. In this case, too, the abutting angle θ should only be varied by about 2 degrees. Therefore, by switching the abutting angle θ with, e.g., the stepping motor 85, it is possible to assign a particular abutting angle θ to each of the operation for picking up the documents (about 10 mm in terms of document feed distance at the initial drive stage of the feed roller 31) and the operation for separating and feeding one document. This obviates misfeed at the time of pick-up and the contamination of the rear of the document at the time of separation and feed.

Figure 23:
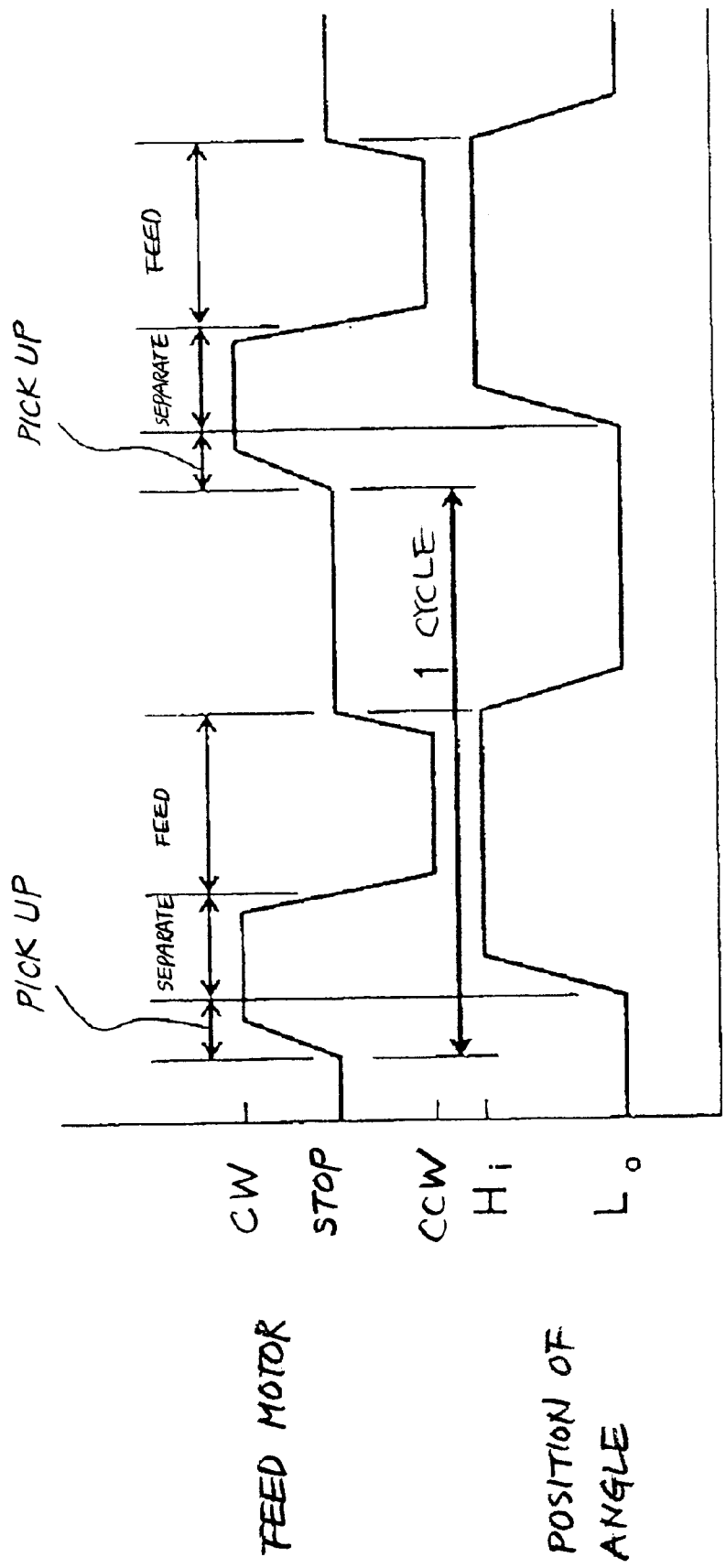
FIG. 23 is a timing chart demonstrating control over an L-shaped angle included in the third embodiment.

FIG. 23 is a timing chart demonstrating the control over the movement of the angle 82. As shown, when the document is to be picked up, the angle 82 is held at the Lo side in order to reduce the abutting angle θ. During document separation and feed following the pick-up, the angle 82 is shifted to the Hi side in order to increase the abutting angle θ.

The above arrangement of the separating section 80 is capable of varying the abutting angle θ even when two different document modes exist, i.e., a thin document or sheet mode and a thick document or sheet mode. In this case, the Hi side and Lo side assigned to the angle 82 include two positions each, i.e., positions Hi1 and Hi2 or positions Lo1 and Lo2, in accordance with a mode signal to be input on inputting means. The inputting means may be provided on, e.g., an operation panel, not shown, included in the copier body. As for the abutting angle θ, such four positions have a relation of θ(hi1)>θ(Hi2)>θ(Lo1)>θ(Lo2).

FIG. 24 lists a relation between the position of the angle 82, the document mode, and the stage of operation. As shown, because thin documents or sheets are more likely to be fed together than thick documents or sheets, greater angles θ are assigned to the former documents than to the latter documents for both the pick-up and the separation and feed. This reduces the contamination of the rear of the document more positively, and further broadens the range of applicable documents.

FIGS. 25 and 26 demonstrate the operation of the illustrative embodiment. As shown, a press lever 88 extends from the leading end portion of the conveying surface of the guide body 71A toward the feed roller 31. Assume that the angle 82 is shifted toward the Lo side, and that the guide body 71A is rotated toward the feed roller 31. Then, one end of the press lever 88 contacts the feed roller 31 in order to avoid misfeed tendency. At this instant, a stop portion 89 positioned at the other end of the press lever 88 stops the lever 88. As a result, the lever 88 rotates about a shaft 90 from a position shown in FIG. 25 and where it does not contact the feed roller 31 to a position shown in FIG. 26 and where it contacts the documents A. Because the guide 81 moves toward the feed roller 31 in accordance with the sequence shown in FIG. 23, the lever 88 pressingly contacts the feed roller 31 at the time of pick-up. This increases the picking force acting on the documents A.

Figure 27:
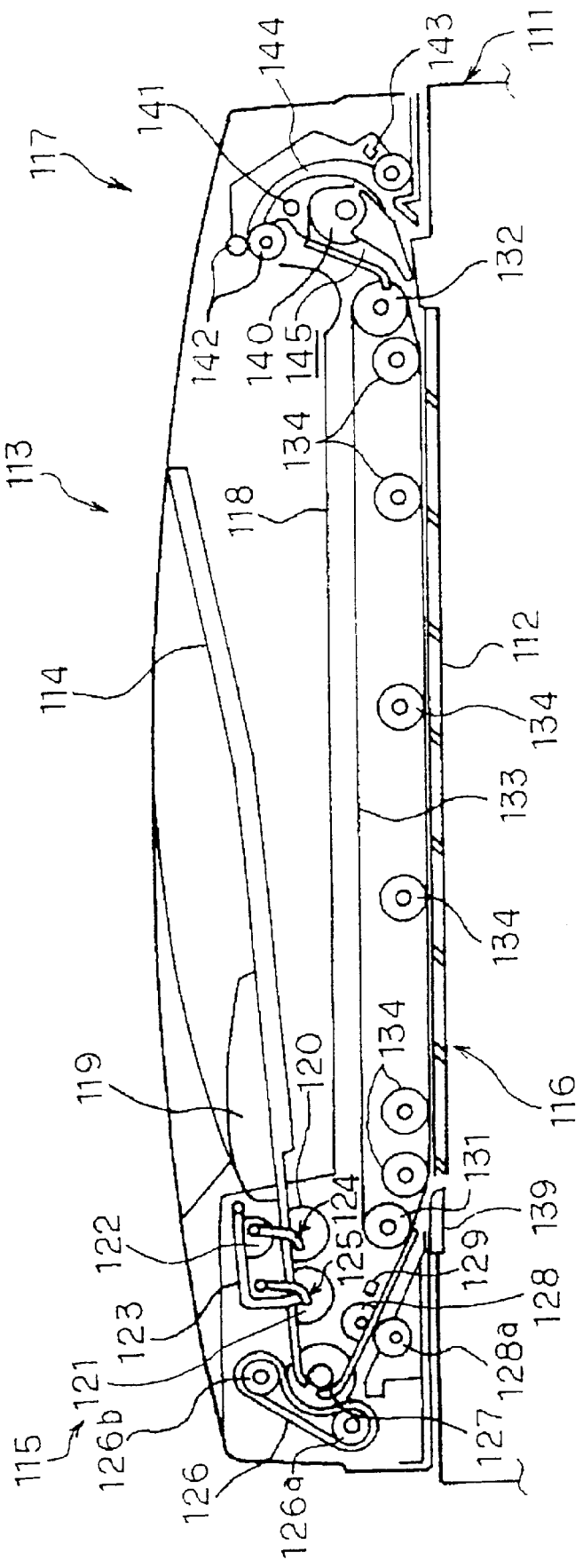
FIG. 27 is a fragmentary section showing a fourth embodiment of the present invention.
Figure 28:
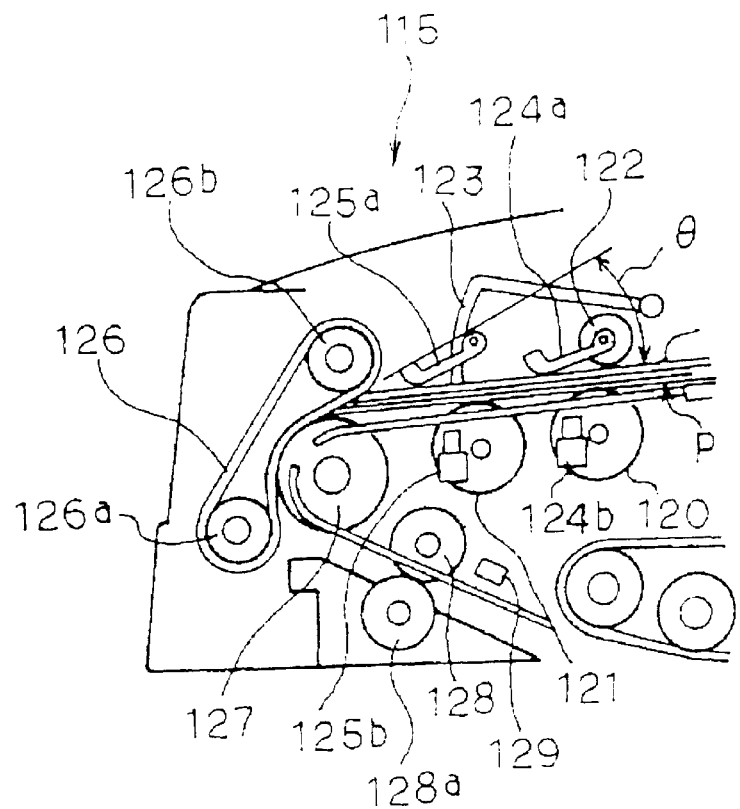
FIG. 28 is a fragmentary section showing a separating and feeding mechanism included in the fourth embodiment.

Referring to FIGS. 27–33, a fourth embodiment of the ADF in accordance with the present invention is shown. FIGS. 27 and 28 show a copier, facsimile apparatus, scanner or similar image reading apparatus 111. A glass platen 112 is mounted on the top of the apparatus 111. The ADF, generally 113, is mounted on the apparatus 111 in such a manner as to be openable away from the glass platen 112. The ADF 113 sequentially separates documents P stacked on a document tray 114 and conveys them toward the glass platen 112.

The ADF 113 includes a separating and feeding section 115 for feeding the documents P from the tray 114 while separating the lowermost document P from the others. A conveying section 116 conveys the document separated by the section 115 to a preselected reading position defined on the glass platen 112. In addition, after the document positioned on the glass platen 112 has been read, the conveying means 116 drives the document away from the glass platen 112. A discharging section 117 discharges the document driven away from the glass platen 11 by the conveying section 116. Another tray 118 is positioned below the tray 114 in order to receive the document discharged by the discharging section 117.

A side fence 119 is positioned on the tray 114. The side fence 119 positions the document stack P in the widthwide direction of the stack P when brought into contact with one side edge of the stack P (front edge as viewed in FIG. 27). When the side fence 119 is moved in the widthwise direction, it positions the stack P in cooperation with a reference surface facing the side fence 119. The separating and feeding section 115 has a first and a second pick-up roller 120 and 121, a press roller 122, a separating plate 123, a document set sensor 124, a job sensor 125, a separator belt or endless turnable member 126, a separator roller (feed roller) 127, a pull-out roller 128, and a registration sensor 129.

The pick-up rollers 120 and 121 each consists of a plurality of rollers spaced in the widthwise direction of the document stack P and are driven by a feed motor which will be described. The press roller 122 is movable into and out of contact with the pick-up roller 120. After the press roller 122 has been pressed against the pick-up roller 120 via the document stack P, the feed motor is driven. Then, the press roller and pick-up roller 120 cooperate to shift the entire stack P toward the separator belt 126.

The separating plate 123 is movable toward and away from the other pick-up roller 121 by being driven by a solenoid, not shown. When the solenoid is deenergized, the plate 123 is moved toward the roller 121 in order to prevent the document stack P from reaching the separator belt 126.

The document set sensor 124 has a rotatable arm 124a and a photosensor 124b for sensing the arm 124a. When the documents are stacked on the tray 114, they urge the arm 124a upward with the result that the sensor 124b does not sense the arm 124a any further. This shows that the documents are stacked on the tray 114. Likewise, the job sensor 125 has an arm 125a and a photosensor 125b for sensing the arm 125a. When the documents begin to be fed, the documents urge the arm 125a upward with the result that the sensor 125b does not sense the arm 125a any further. This shows that a single document stack P has begun to be fed.

The separator belt 126 is passed over a drive roller 126 a and a driven roller 126b and movable counterclockwise. The registration sensor 129 is responsive to the leading edge and trailing edge of a document and sends its output to a main controller, not shown, on sensing them. The pull-out roller 128 conveys the separated document toward the glass platen 112 in cooperation with a driven roller 128a contacting the roller 128.

Figure 29:
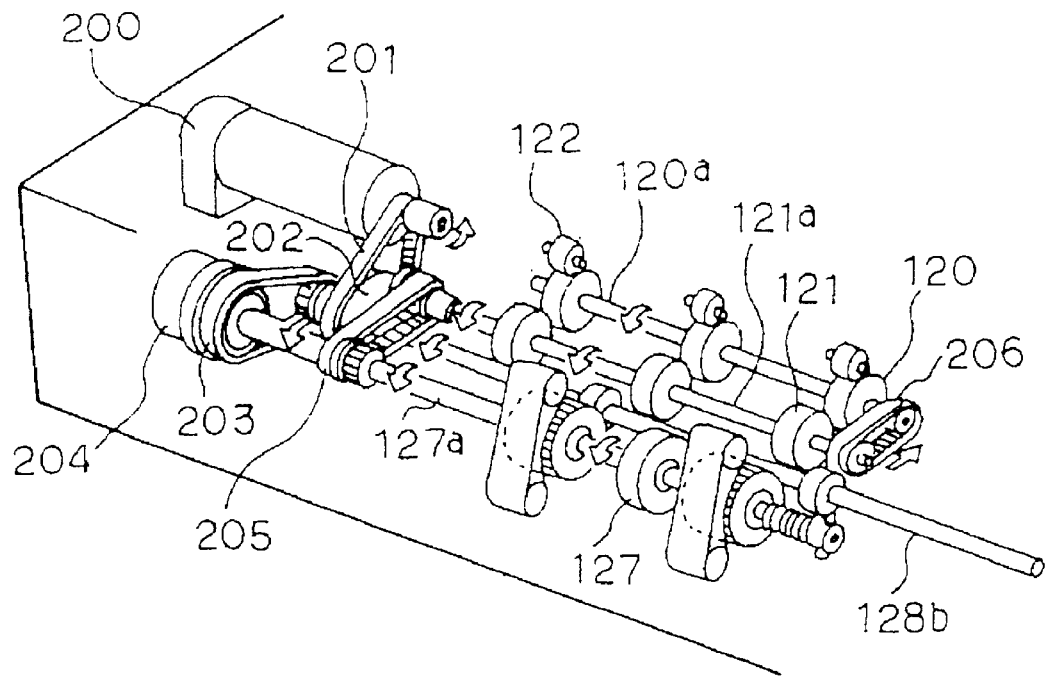
FIG. 29 is a perspective view of a drive arrangement for driving the mechanism of FIG. 28.

FIG. 29 shows an arrangement for driving the separating and feeding section 115. As shown, the arrangement includes a feed motor 200 drivably connected to a pulley 202 by a belt 201. The shaft of the pulley 202 is connected to a clutch 204 by a belt 203 and connected to the shaft 128b of the pull-out roller 128. The clutch 204 is connected to the shaft 127a of the separator roller 127. When the clutch 204 is coupled, it transmits the output torque of the motor 200 to the separator roller 127. When the clutch 204 is uncoupled, it interrupts the drive transmission from the motor 200 to the roller 127.

The shaft 127a of the separator roller 127 is connected to the shaft 121a of the second pick-up roller 121 by a belt 205. The shaft 121a is, in turn, connected to the shaft 120a of the first pick-up roller 120 by a belt 206. In this configuration, when the motor 200 is energized, its output torque is transferred to the pulley 202 via the belt 201 and drives the pull-out roller 128. At the same time, the torque is transferred to the clutch 204 via the belt 203.

When the clutch 204 is coupled, the output torque of the motor 200 drives the separator roller 128 directly connected to the clutch 204, drives the second pick-up roller 121 via the belt 205, and drives the first pick-up roller 120 via the belt 206. When the clutch 204 is uncoupled, the separator roller 127 simply idles. In addition, the drive transmission to the pick-up roller 121 via the belt 205 and the drive transmission to the pick-up roller 120 via the belt 206 are interrupted. As a result, all the rollers 127, 120 and 121 idle.

As shown in FIG. 27, the conveying section 116 includes an endless conveyor belt 133 passed over a drive roller 131 and a driven roller 132 and so positioned as to cover the glass platen 112. A plurality of press rollers 134 press the belt 133 against the glass platen 112. A drive roller 131 is driven by a conveyance motor, not shown, controlled by the main controller. The drive roller 131 conveys the document coming out of the separating and feeding section 115 toward the reading position on the glass platen 112 and stops it there. Reading means including a light source, mirrors, lens and imaging sensor reads the document positioned on the glass platen 112. Subsequently, the main controller causes the conveyance motor to rotate forward. As a result, the conveyor belt 133 conveys the document away from the glass platen 112 toward the discharging section 117.

A document mode switch or document mode selecting means, not shown, is provided on the operation panel. When the operator operates this switch, the conveying means 116 conveys the document in one of an abutment mode and a non-abutment mode. In the abutment mode, the document is positioned on abutting against a scale 139 located at one end of the glass platen 112. In the non-abutment mode, the document is brought to a stop without abutting against the scale 139.

Figure 31A:
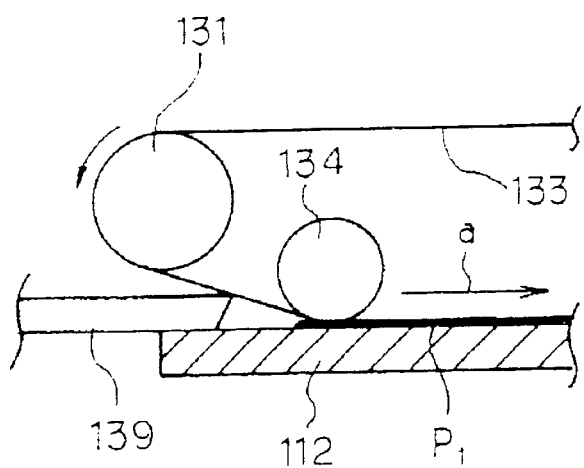
FIGS. 31A and 31B demonstrate a thick document mode particular to the fourth embodiment.
Figure 31B:
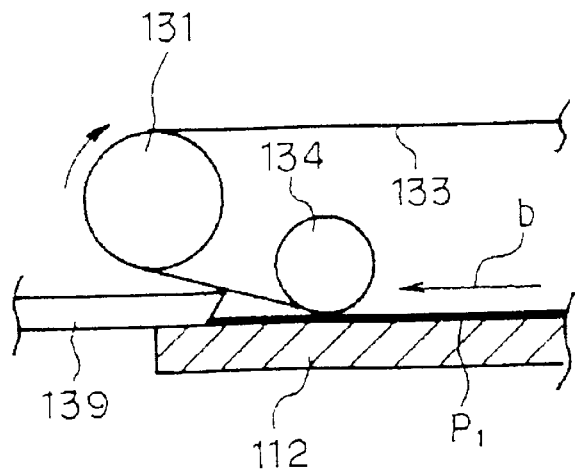

Specifically, assume that the operator selects a thick document or sheet mode on the document mode switch. Then, as shown in FIG. 31A, the conveying section 116 conveys a document P1 in a direction a beyond the scale 139. Subsequently, as shown in FIG. 31B, the section 116 returns the document P1 in a direction b until the document P1 abuts against the scale 139. This successfully corrects the skew of the document P1. For this kind of control, as soon as the registration sensor 129 senses the trailing edge of the document P1, the main controller starts counting the rotation pulses of the conveyance motor and drives the belt 133 forward and reverse on the basis of the number of pulses.

Assume that the operator selects a thin document or sheet mode on the document mode switch. Then, the conveying section 116 conveys the document in the direction a until the trailing edge of the document coincides with the scale 134, and then stops the belt 13. For this kind of control, as soon as the registration sensor 129 senses the trailing edge of the document, the main controller starts counting the rotation pulses of the conveyance motor. When the number of pulses reaches a number representative of the coincidence of the edge of the document with the scale 139, the main controller stops driving the belt 133.

As shown in FIG. 27, the discharging means 117 has a turn roller 140, a turn guide 141, a discharge roller pair 142, and a discharge sensor 143. The turn roller 140 is driven counterclockwise by a discharge motor, not shown, to convey the document along a turn path 144. Subsequently, the discharge roller pair 142 discharges the document onto the tray 118 below the tray 114.

The turn guide or path selector 141 is provided on the turn path 144 and selects one of a first path for discharging the document to the tray 118 and a second path for returning it to the glass platen 112 via a return path 145. The turn guide 141 is operated by a solenoid, not shown. Specifically, after a simplex document has been read, the main controller causes the turn solenoid to switch the turn guide 141 to the first path and thereby discharges the document to the tray 118. After a duplex document has been read, the main controller causes the turn solenoid to switch the turn guide 141 to the second path and thereby returns the document to the glass platen 112. The discharge sensor 143 also located on the turn path 144 senses the trailing edge of the document discharged and sends its output to the main controller.

Figure 30:
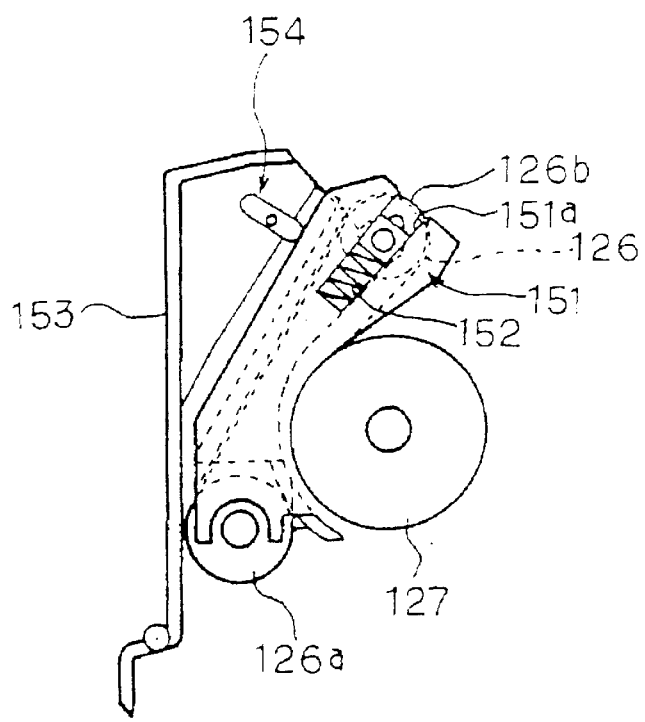
FIG. 30 is a side elevation of an abutting angle varying mechanism also included in the fourth embodiment.

The drive roller 126a is journalled to the body of the ADF 113 while the driven roller 126b is rotatable about the drive roller 126a. As shown in FIG. 30, the drive roller 126a, driven roller 126b and separator belt 126 are mounted on a holder or pivotable body 151. The holder 151 is formed with a notch 151a. A spring 152 has one end thereof anchored to the bottom of the notch 151a and constantly biases the driven roller 126b. In this condition, a preselected degree of tension acts on the belt 126 and urges it against the roller 127.

A cover 153 is openably mounted on the body of the ADF 113. The cover 153 presses the holder 155 and thereby presses the separator belt 126 against the separator roller 127 with the drive roller 126a serving as a fulcrum. In addition, the cover 153 is configured such that as the belt 126 moves toward the roller 127, the abutting angle decreases. It is to be noted that the abutting angle refers to the angle θ between the surface of the documents laid on the tray 114 and the surface of the portion of the belt 126 against which the leading edges of the documents will abut.

A link or variable member 154 is rotatably mounted on the cover 153. The link 154 is driven by a solenoid, not shown, to move between a position where the holder 151 contacts the cover 153 and a position where the former is spaced from the latter. If desired, the solenoid for driving the link 154 may be replaced with a stepping motor. The abutting angle increases when the link 154 is moved to the position where the holder 151 contacts the cover 153, or decreases when the holder 151 is moved to the other position. As shown in FIG. 29, the embodiment includes two separator belts 126, so that two links 154 are provided and respectively associated with the belts 126.

Further, when the thin sheet mode is selected, the main controller energizes the solenoid and causes it to move the holder 151 away from the cover 153 via the link 154, thereby reducing the abutting angle. When the thick sheet mode is selected, the main controller deenergizes the solenoid and causes it to move the holder 151 into contact with the cover 153 via the link 154, thereby increasing the abutting angle.

In the illustrative embodiment, the drive roller 126a, driven roller 126b and holder 151 constitute an angle varying mechanism while the main controller plays the role of control means. While the driven roller 126b has been shown and described as being rotatable about the drive roller 126a, the drive roller 126a may be rotatable about the driven roller 126b, if desired.

In operation, the document stack P is set while abutting against the separating plate 123, and then the document mode switch is operated to set a desired document mode. On the start of operation of the copier, the main controller sets the abutting angle of the separator belt 126 matching the mode selected, as stated above. Subsequently, the main controller releases the separating plate 123, drives the feed motor 200, and couples the clutch associated with the motor 204. As a result, the first and second pick-up rollers 102 and 121, separator roller 127 and pull-out roller 128 start rotating and drive the leading edge of the document stack P to the nip between the belt 126 and the roller 127. At this instant, only the lowermost document is separated by the roller 127 with the overlying documents obstructed by the belt 126. The separated document is conveyed to the glass platen 122 by the pull-out roller 128 and conveyor belt 133. In the thick sheet mode, the document is caused to run over the scale 139 on the glass platen 112 and then return until it abuts against the scale 139. In the thin sheet mode, the document is brought to a stop when its trailing edge coincides with the scale 139.

After the document positioned on the glass platen 112 has been read, it is conveyed away from the glass platen 12 and then driven out to the tray 108 by the discharging section 117.

As stated above, in this embodiment, the link 154 moves the holder 151 toward or away from the separator roller 127 in order to vary the abutting angle. Therefore, to separate relatively thick documents, the abutting angle is reduced to promote the smooth entry of the documents in the nip between the belt 126 and the roller 127, thereby avoiding misfeed. For relatively thin documents, the abutting angle is increased in order to insure the separation of the documents. This eliminates the simultaneous feed of a plurality of documents. The embodiment therefore enhances the separation of the documents without regard to their thickness and thereby obviates defective document feed including misfeed and overlapping feed.

Assume that the separator roller 127 is moved toward and away from the holder 151. Then, because the axis of the roller 127 must be shifted, a complicated and costly angle varying mechanism is needed which includes a great number of parts. By contrast, the embodiment moves the holder 151 toward and away from the separator roller 127 via the link 154 so as to vary the abutting angle. This prevents the angle varying mechanism from being complicated, and prevents the number of parts and therefore the cost of the mechanism from increasing.

In the above embodiment, the link 154 is automatically controlled to vary the abutting angle in matching relation to the mode selected, i.e., thick document mode or thin document mode. The abutting angle is automatically reduced in the thick document mode or automatically increased in the thin document mode. This not only obviates defective document feed but also enhances easy operation to a noticeable degree.

Because the embodiment includes two separator belts 126 and two links 154, the links 154 may individually set the abutting angles of the associated belts 126. For example, when the abutting angle differs from one ADF to another ADF, some skew occurs at the time of separation and feed of a document. This kind of skew can be obviated if the belts 126 have their abutting angles optimized independently of each other.

Figure 32:
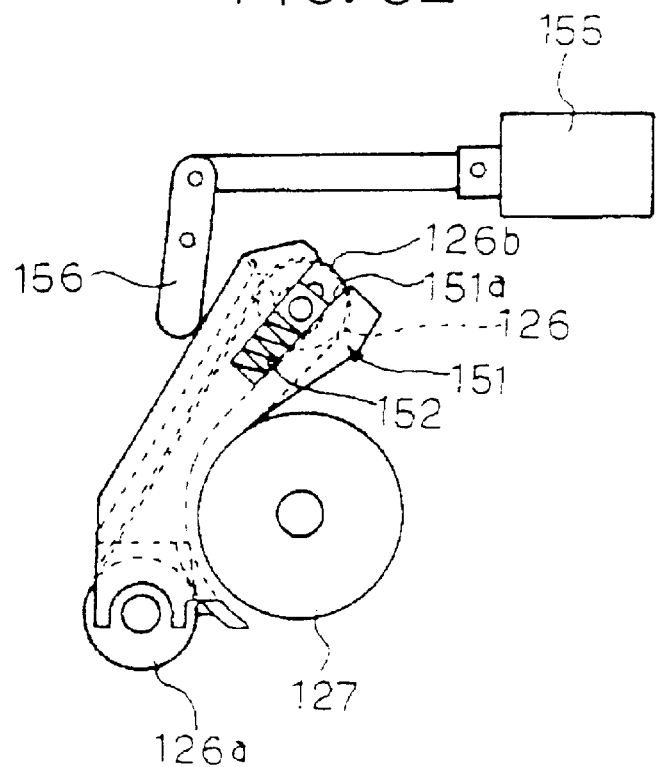
FIG. 32 is a side elevation showing a modification of the fourth embodiment.

FIG. 32 shows a link or variable member 156 replacing the link 154 rotatably mounted on the cover 151. As shown, the link 156 is implemented as a member independent of the cover 151. A solenoid 155 is selectively turned on or turned off in order to rotate the link 156 such that the abutting angle of the belt 126 is variable in two steps.

Figure 33:
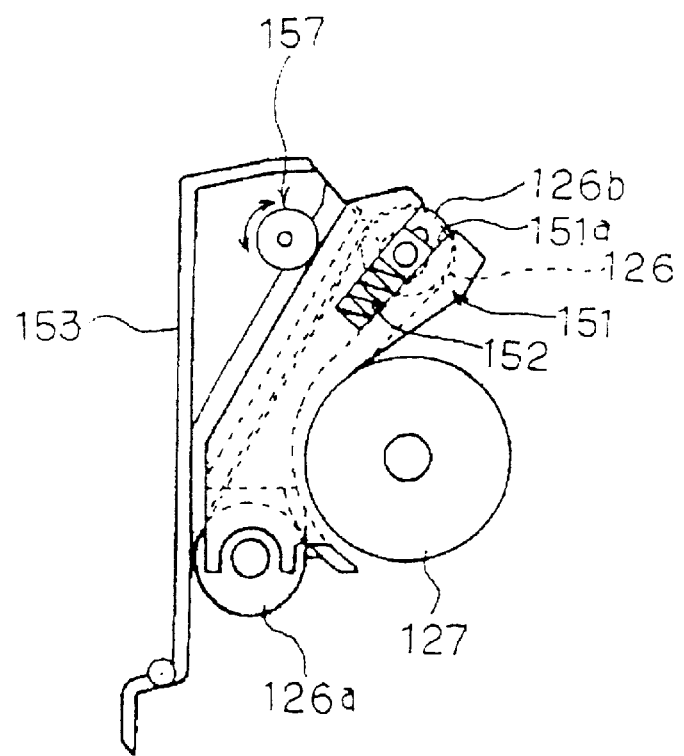
FIG. 33 is a side elevation showing another modification of the fourth embodiment.

If desired, the abutting angle of the belt 126 may be varied in three or more steps. Specifically, as shown in FIG. 33, a cam or variable member 157 is rotatably mounted on the cover 151 and driven by a stepping motor, not shown. With this configuration, it is possible to vary the abutting angle of the belt 126 in multiple steps in accordance with the thickness of documents. In this case, multiple document modes including "thick", "slightly thick", "ordinary", "slightly thin" and "thin" may be provided on the operation panel. When any one of such different modes is selected, the main controller will control the stepping motor in such a manner as to optimize the abutting angle. The multistep abutting angle allows the document separating condition to be varied delicately, further enhancing the separation of the document.

The operator may assign each of the document modes available on the operation panel to a particular document thickness. For example, assume that the operator knows the thicknesses of documents to use beforehand, e.g., modes A, B and S should be assigned to thick sheets, recycled sheets, and thin sheets, respectively. Then, if the various modes are each matched to a particular abutting angle, the cam 157 will be brought to its angular position matching the mode selected.

In summary, it will be seen that the present invention provides a document separating mechanism for an ADF and having various unprecedented advantages, as enumerated below.

(1) The angle at which the leading edges of documents fed from a tray abut against a strip-like turnable member is adequately variable. This allows the documents to be surely separated on abutting against the turnable member. In addition, the consecutive documents sparingly rub against each other and are therefore free from contamination.

(2) Pressure acting between the turnable member and a feed roller is variable between the time of abutment of the documents and the time of document feed. This allows the pressure to be optimally adjusted and achieves the above advantage (1).

(3) The pressure is selected to be lower during operation following the entry of the document in a nip between the pick-up roller and the turnable member than at the time of the entry. This effectively obviates defective document feed including misfeed and overlapping feed.

(4) When the arrival of the document at a conveyor roller is delayed by more than a preselected period of time, the above pressure is increased in order to insure the feed of the document.

(5) A rotatable press lever is mounted on a pivotable body and presses documents stacked on the tray with its free end. This obviates misfeed more positively, particularly when the document stack is shifted.

(6) To separate thick documents or sheets, the abutting angle is reduced in order to promote the smooth entry of the documents in the nip between the turnable member and the feed roller. The thick documents can therefore be surely separated and fed. For thin documents or sheets, the abutting angle is increased in order to surely separate the documents to thereby obviate overlapping feed. Consequently, when the documents abut against the turnable member, the separating ability is enhanced without regard to the thickness of the documents.

(7) Assume that the feed roller is moved toward and away from the turnable body. Then, because the axis of the roller must be shifted, a complicated and costly angle varying mechanism is needed which includes a great number of parts. By contrast, the mechanism of the present invention moves the turnable body toward and away from the roller so as to vary the abutting angle. This prevents the angle varying mechanism from being complicated, and prevents the number of parts and therefore the cost of the mechanism from increasing.

(8) Because the abutting angle is variable in multiple steps, the document separating condition can be varied delicately in order to further enhance the separation of the documents.

(9) When a thick document mode is selected on document mode selecting means, the abutting angle is automatically reduced. When a thin document mode is selected, the abutting angle is automatically increased. This also obviates the defective document feed and promotes easy operation to a noticeable degree.

(10). When the abutting angle differs from one ADF to another ADF, some skew occurs at the time of separation and feed of a document. This kind of skew can be obviated because the abutting angle of the individual turnable member is optimized.

Various modifications will become possible for those skilled in the art after receiving the teachings of the present disclosure without departing from the scope thereof.

What is claimed is:

1. A document separating mechanism for an ADF and for separating documents stacked on a tray one by one while feeding the documents to a preselected position, said mechanism comprising:

a feed roller rotatable in an intended direction of document feed relative to the documents stacked on the tray;

a strip-like turnable member movable in a direction opposite to the intended direction of document feed in pressing contact with said feed roller, wherein the documents are abutted against said turnable member at leading edges thereof and received between said feed roller and said turnable member; and an abutting angle varying mechanism for varying between at least two angles an abutting angle between a surface of the documents stacked on the tray and a surface of a portion of said turnable member against which the leading edges of the documents abut.

2. A mechanism as claimed in claim 1, wherein said abutting angle varying mechanism varies said abutting between a time of abutment of the documents and a time of document feed.

3. A mechanism as claimed in claim 2, wherein said abutting angle varying mechanism comprises:

a drive roller and a driven roller over which said turnable member is passed;

a pivotable body carrying said drive roller and said driven roller, and pivotable about a shaft, and so set as to reduce said abutting angle as said turnable member approaches said feed roller;

a spring constantly biasing said pivotable body such that said turnable member makes surface-to-surface pressing contact with said feed roller; and drive control means for controllably rotating said drive roller.

4. A mechanism as claimed in claim 3, further comprising a press lever pivotally mounted on said pivotable body, for pressing the documents on the tray with a free end of said press lever, wherein said press lever is sequentially movable to a pressure cancelling position and a pressing position as said pivotable body moves such that said turnable member approaches said feed roller.

5. A mechanism as claimed in claim 2, further comprising document mode selecting means for allowing a desired document mode relating to a thickness of the documents to be selected, wherein said abutting angle is selected to be smaller in a thick sheet mode selected on said document mode selecting means than in a thin sheet mode.

6. A mechanism as claimed in claim 2, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

7. A mechanism as claimed in claim 2, wherein said abutting angle varying mechanism comprises:

a drive roller and a driven roller over which said turnable member is passed;

a pivotable body carrying said drive roller and said driven roller, and pivotable about a shaft, and so set as to reduce said abutting angle as said turnable member approaches said feed roller;

a stop member for stopping said pivotable body at a position where said turnable member makes surface-to-surface pressing contact with said feed roller, and for allowing said position of said turnable member to be varied; and stop member control means for variably controlling said stop member.

8. A mechanism as claimed in claim 7, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

9. A mechanism as claimed in claim 7, further comprising document mode selecting means for allowing a desired document mode relating to a thickness of the documents to be selected, wherein said abutting angle is selected to be smaller in a thick sheet mode selected on said document mode selecting means than in a thin sheet mode.

10. A mechanism as claimed in claim 9, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

11. A mechanism as claimed in claim 2, wherein said abutting angle is selected to be greater during operation following a beginning of entry of the documents between said feed roller and said turnable member than during operation up to said beginning of entry.

12. A mechanism as claimed in claim 11, further comprising document mode selecting means for allowing a desired document mode relating to a thickness of the documents to be selected, wherein said abutting angle is selected to be smaller in a thick sheet mode selected on said document mode selecting means than in a thin sheet mode.

13. A mechanism as claimed in claim 12, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

14. A mechanism as claimed in claim 11, further comprising means for counting pulses relating to a rotation angle of a drive motor for driving said feed roller, thereby determining whether or not the documents have been received between said feed roller and said turnable member.

15. A mechanism as claimed in claim 11, further comprising document sensing means located on a document feed path downstream of, but adjacent to, said feed roller and said turnable member, for determining whether or not the documents have been received between said feed roller and said turnable member.

16. A mechanism as claimed in claim 11, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

17. A mechanism as claimed in claim 2, further comprising document mode selecting means for allowing a desired document mode relating to a thickness of the documents to be selected, wherein said abutting angle is selected to be smaller in a thick sheet mode selected on said document mode selecting means than in a thin sheet mode.

18. A mechanism as claimed in claim 17, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

19. A mechanism as claimed in claim 1, wherein said abutting angle varying mechanism comprises:

a drive roller and a driven roller over which said turnable member is passed;

a pivotable body carrying said drive roller and said driven roller, and pivotable about a shaft, and so set as to reduce said abutting angle as said turnable member approaches said feed roller;

a spring constantly biasing said pivotable body such that said turnable member makes surface-to-surface pressing contact with said feed roller; and drive control means for controllably rotating said drive roller.

20. A mechanism as claimed in claim 19, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

21. A mechanism as claimed in claim 1, wherein said abutting angle varying mechanism comprises:

a drive roller and a driven roller over which said turnable member is passed;

a pivotable body carrying said drive roller and said driven roller, and pivotable about a shaft, and so set as to reduce said abutting angle as said turnable member approaches said feed roller;

a stop member for stopping said pivotable body at a position where said turnable member makes surface-to-surface pressing contact with said feed roller, and for allowing said position of said turnable member to be varied; and stop member control means for variably controlling said stop member.

22. A mechanism as claimed in claim 21, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

23. A mechanism as claimed in claim 21, further comprising document mode selecting means for allowing a desired document mode relating to a thickness of the documents to be selected, wherein said abutting angle is selected to be smaller in a thick sheet mode selected on said document mode selecting means than in a thin sheet mode.

24. A mechanism as claimed in claim 23, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

25. A mechanism as claimed in claim 1, wherein said abutting angle is selected to be greater during operation following a beginning of entry of the documents between said feed roller and said turnable member than during operation up to said beginning of entry.

26. A mechanism as claimed in claim 25, further comprising document mode selecting means for allowing a desired document mode relating to a thickness of the documents to be selected, wherein said abutting angle is selected to be smaller in a thick sheet mode selected on said document mode selecting means than in a thin sheet mode.

27. A mechanism as claimed in claim 26, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

28. A mechanism as claimed in claim 25, further comprising means for counting pulses relating to a rotation angle of a drive motor for driving said feed roller, thereby determining whether or not the documents have been received between said feed roller and said turnable member.

29. A mechanism as claimed in claim 25, further comprising document sensing means located on a document feed path downstream of, but adjacent to, said feed roller and said turnable member, for determining whether or not the documents have been received between said feed roller and said turnable member.

30. A mechanism as claimed in claim 25, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

31. A mechanism as claimed in claim 1, further comprising document mode selecting means for allowing a desired document mode relating to a thickness of the documents to be selected, wherein said abutting angle is selected to be smaller in a thick sheet mode selected on said document mode selecting means than in a thin sheet mode.

32. A mechanism as claimed in claim 31, further comprising a press lever pivotally mounted on said pivotable body, for pressing the documents on the tray with a free end of said press lever, wherein said press lever is sequentially movable to a pressure cancelling position and a pressing position as said pivotable body moves such that said said turnable member approaches said feed roller.

33. A mechanism as claimed in claim 1, wherein said document abutting angle varying mechanism comprises:

a drive roller and a driven roller over which said turnable member is passed;

a pivotable body carrying said drive roller and said driven roller, and pivotable about a shaft, and so set as to reduce said abutting angle as said turnable member approaches said feed roller; and a variable member for varying said abutting angle by moving said pivotable body toward or away from said feed roller.

34. A mechanism as claimed in claim 33, wherein a plurality of said turnable members and a plurality of said abutting angle varying mechanisms are provided, and wherein said abutting angle varying mechanisms each sets said abutting angle of a respective turnable member.

35. A mechanism as claimed in claim 33, wherein said variable member moves said pivotable body toward and away from said feed roller in such a manner as to vary said abutting angle.

36. A mechanism as claimed in claim 35, wherein a plurality of said turnable members and a plurality of said abutting angle varying mechanisms are provided, and wherein said abutting angle varying mechanisms each sets said abutting angle of a respective turnable member.

37. A mechanism as claimed in claim 33, further comprising document mode selecting means for allowing a desired document mode relating to a thickness of the documents to be selected, and control means for automatically controlling said variable member such that said abutting angle varies on the basis of a thick document mode or a thin document mode selected.

38. A mechanism as claimed in claim 37, wherein a plurality of said turnable members and a plurality of said abutting angle varying mechanisms are provided, and wherein said abutting angle varying mechanisms each sets said abutting angle of a respective turnable member.

39. A document separating mechanism for an ADF and for separating documents stacked on a tray one by one while feeding said documents to a preselected position, said mechanism comprising:

a feed roller rotatable in an intended direction of document feed relative to the documents stacked on the tray;

a strip-like turnable member movable in a direction opposite to the intended direction of document feed in pressing contact with said feed roller, wherein the documents are abutted against said turnable member at leading edges thereof and received between said feed roller and said turnable member; and a pressure varying mechanism for varying a pressure acting between said feed roller and said turnable member between a time of abutment when the documents enter a nip between the feed roller and the turnable member and a time of document feed.

40. A mechanism as claimed in claim 39, wherein said pressure is selected to be lower during operation following a beginning of entry of the documents between said feed roller and said turnable member than during operation up to said beginning of entry.

41. A mechanism as claimed in claim 40, further comprising means for counting pulses relating to a rotation angle of a drive motor for driving said feed roller, thereby determining whether or not the documents have been received between said feed roller and said turnable member.

42. A mechanism as claimed in claim 40, further comprising document sensing means located on a document feed path downstream of, but adjacent to, said feed roller and said turnable member, for determining whether or not the documents have been received between said feed roller and said turnable member.

43. A mechanism as claimed in claim 39, further comprising sensing means for sensing arrival of the document separated from the other documents at a conveyor roller located downstream of said feed roller, wherein said document is fed to said preselected position when the arrival is sensed by said sensing means.

44. A mechanism as claimed in claim 43, wherein said pressure is selected to be lower during operation following a beginning of entry of the documents between said feed roller and said turnable member than during operation up to said beginning of entry, and wherein when the arrival of the document separated from the other documents is delayed by more than a preselected period of time, said pressure is increased.

45. A document separating mechanism for an ADF and for separating documents stacked on a tray one by one while feeding said documents to a preselected position, said mechanism comprising:

a feed roller rotatable in an intended direction of document feed relative to the documents stacked on the tray;

a strip-like turnable member movable in a direction opposite to the intended direction of document feed in pressing contact with said feed roller, wherein the documents are abutted against said turnable member at leading edges thereof and received between said feed roller and said turnable member; and an abutting angle varying mechanism for varying between at least two angles an abutting angle between a surface of the documents stacked on the tray and a surface of a portion of said turnable member against which the leading edges of the documents abut.

46. A document separating mechanism for an ADF and for separating documents stacked on a tray one by one while feeding said documents to a preselected position, said mechanism comprising:

a feed roller rotatable in an intended direction of document feed relative to the documents stacked on the tray;

a strip-like turnable member movable in a direction opposite to the intended direction of document feed in pressing contact with said feed roller, wherein the documents are abutted against said turnable member at leading edges thereof and received between said feed roller and said turnable member; and a pressure varying mechanism for varying a pressure acting between said feed roller and said turnable member between a time of abutment when the documents enter a nip between the feed roller and the turnable member and a time of document feed.

* * * * *